United States Patent [19]
McCullough et al.

[11] Patent Number: 5,974,393
[45] Date of Patent: Oct. 26, 1999

[54] AUTOMATIC CUSTOMER NUMBER PAGING SYSTEM

[76] Inventors: Robert K. McCullough; Daniel R. McCullough, both of P.O. Box 1700, Broken Arrow, Okla. 74013

[21] Appl. No.: 08/931,024

[22] Filed: Sep. 15, 1997

Related U.S. Application Data

[63] Continuation-in-part of application No. 08/785,340, Jan. 17, 1997.

[51] Int. Cl.$^6$ .................................................. G04B 19/00
[52] U.S. Cl. ............................... 705/8; 705/16; 340/311.1
[58] Field of Search ................................... 705/16, 8, 21, 705/24; 340/311.1

[56] References Cited

U.S. PATENT DOCUMENTS

| | | | |
|---|---|---|---|
| 4,992,774 | 2/1991 | McCullough | 340/310 |
| 5,245,163 | 9/1993 | Yehuda | 235/377 |
| 5,377,097 | 12/1994 | Fuyama et al. | 364/401 |
| 5,390,107 | 2/1995 | Nelson et al. | 364/401 |
| 5,541,835 | 7/1996 | Dextrase et al. | 364/401 |

OTHER PUBLICATIONS

Microframe, Customer Paging with the 900 Series Visual–Pager, http://www.microframecorp.com/restrant.html, p. 2, no date.

Visual–Page Systems series 3600 Pharmacy Customer Call Sales Brochure dated Jun. 1993.

*Primary Examiner*—Thomas R. Peeso
*Attorney, Agent, or Firm*—Robert R. Keegan; Head, Johnson & Kachigian

[57] ABSTRACT

There is disclosed a paging system for customers in a fast service or while-you-wait sales or service facility which is capable of being associated with or integrated with existing forms of point-of-sale hardware and software systems. The paging system notifies customers by means of an audio announcement or visual display, or both, that their order for service, identified by customer number, is ready to be delivered upon their return to the customer counter or to the delivery location. The system suppresses keyboard errors and permits correction thereof and provides for the display of several customer numbers on a continual basis until a respective customer number is deleted automatically or in response to manual input. Optionally, a skipped number feature makes service personnel aware of misdirection or unusual delay in fulfilling an order. Provision is made for two-way communication of data between hardware and software for the customer paging function and the conventional point-of-sale software and hardware with which it is associated or integrated.

21 Claims, 26 Drawing Sheets

AUTOMATIC CUSTOMER NUMBER PAGING SYSTEM

CROSS-REFERENCE TO RELATED APPLICATION

This application is a continuation-in-part of U.S. patent application Ser. No. 08/785,340, filed Jan. 17, 1997, and still pending before the U.S. Patent and Trademark Office.

BACKGROUND OF THE INVENTION

The present invention relates to situations in which services or products are provided, usually by multiple servers, to numerous persons being served in which the tasks are identified by a number or otherwise, and completion of service is communicated to a person being served, usually a customer, by the task identification. In such systems, it is desirable to have a method of notifying customers of the completion of their order processing so that the customers do not have to wait for their order completion and can be free to complete other tasks and return upon completion of their order processing. The method and apparatus according to the invention is particularly adapted to use in high volume pharmacies and that particular use will be explained for the purpose of illustration. Clearly the system will have many other uses as in fast food establishments and other "while you wait" or fast service environments.

The system according to the invention is particularly useful in large retail stores where there is a pharmacy or other fast service department. In the absence of such a system, customers would take their prescriptions to the pharmacy to be filled and would often wait near the counter until the task of filling the prescription was completed and the customer's name or the order's identifying marker was called.

If the prescription is identified by a number (normally issued in increasing order) or other marker, it is then possible to provide a display visible from all parts of the retail store, by means of which the customer can be advised of the completion of the task of filling his prescription by display of the assigned number or marker. Such a system has several advantages, not the least of which if that pharmacy customers circulating in the store may find other items to purchase. Computerized control apparatus, as well as the method, is disclosed for implementing the system and will be described in detail hereinafter. A practical way to implement the system is by auxiliary microcomputer software controlled apparatus although it is possible to implement the method using subroutines in (POS) point-of-sale software to drive compatible numeric or alpha-numeric display units.

Numerous forms of queue monitoring or control systems, customer order processing systems, and the like have been proposed having generally similar objectives, but they do not suggest or disclose the apparatus and method of the present invention.

U.S. Pat. No. 5,245,163 to Yehuda shows a system for monitoring the combined waiting and service time for customers in a single queue with multiple service clerks scenario. The system monitors every customer transaction to establish the total time it takes for the customer to get to a service representative through the use of a card dispenser at the end of the queue and a card reader at each service station. While Yehuda dispenses sequentially numbered cards to the customers and uses a data processor to control information, the Yehuda system is only concerned with queue waiting time and not the notification of waiting customers upon completion of their order. Furthermore, the Yehuda system requires manual manipulation of cards and additional steps for number processing. Thus, Yehuda does not disclose the invention contained herein.

U.S. Pat. No. 5,541,835 to Dextraze et al. discloses a system for monitoring the combined waiting time for customers in a single queue with multiple service clerks scenario. The system monitors every customer transaction to establish the total time it takes for the customer to get through the queue and be fully serviced. It does this through a sensor at the end of the queue and sensors located at each service station. Dextraze does not notify customers upon completion of their orders.

U.S. Pat. No. 5,390,107 to Nelson et al. shows a system designed to monitor the entry and exit of customers to determine the number of customers within a store. It then uses this information to predict the appropriate number of service personnel at a future time. This allows the store to establish an appropriate balance between clerk efficiency and customer service. This system differs from McCullough in that Nelson monitors the customer entry and exit rates for the store, measuring shopping time, line-waiting time, and service time; Nelson uses pre-established customer and service characteristics to predict future events; and Nelson monitors customer time within the store. Nelson does not notify customers of the completion of their order.

U.S. Pat. No. 5,377,097 to Fuyama et al. discloses a system for servicing of customers in a fast-food type restaurant environment. The system sequentially controls the processing of customers through the system and gives an efficient method for the processing of food orders. This system monitors the customer total service time and alerts by a blinking light when the service time exceeds a preset limit. Fuyama allows for the recall of mistakenly deleted orders and the correction of order item entries while McCullough allows for the deletion of an incorrect entry and correction of the number sequence; Fuyama displays the total customer service time to the operators on every order and can blink the service time when an excessive amount of time has lapsed while McCullough only displays the customer order marker number. Fuyama deletes the order from the display upon completion of the food preparation and does not disclose the use of a display to alert customers of an order completion.

To summarize the above comments, none of these prior systems have a method for displaying completed orders ready for pickup.

A prior McCullough U.S. Pat. No. 4,992,774 is the basis for a commercial pharmacy customer call system in use since 1993 which provides discreet paging by numerical display, but has no system for generating and controlling the customer service monitoring features.

SUMMARY OF THE INVENTION

This system i s designed to page customers from a large area, such as a retail store, back to a pick-up counter when their food, prescription or product is ready. This system has keypad entry or can be attached to or become a part of the cash register or point-of-sale (POS) terminal and is distinguished by the fact that it displays on large remote displays some distinctive marker or number assigned to each customer, for example the last 2 or 3 digits of the cash register ticket or transaction number. For ease of explanation, only the numerical display is described herein, but markers of letters, customer names, or other distinguishing marks or pictorial images could be used. Each of the displays are visible to waiting customers and may be termed customer presence area displays or wide area displays. After an optional preprogrammed auto delete time these numbers may be deleted from the display. This system has a means of keeping track of 100 or more different paged numbers and recording which numbers are skipped. As an option feature the skipped numbers are displayed after a preprogrammed time on the keypad or a larger remote display in the service area so that skipped customers may be attended to. The keypad preferably has the enhanced display which shows the same six two-digit numbers as the large remote display which allows a server to monitor paged numbers. Typically the following information is broadcast in six byte format: top row current number, bottom row current number, single current number, entered number, delete number, skipped number and master assertion command. This allows for a single two-digit display and a six two-digit display to be driven from the same wire pair. A large, single number, two-digit display may be outdoors displaying all the numbers the same as multiple, six number, two-digit displays indoors. Another optional feature is a contact closure on each display which will operate a chime when a new number appears on the current screen. An optional configuration would have an automatic voice announcement of that new number using conventional voice synthesizer technology triggered by the software and cash register or POS terminal. This system makes a major contribution to a retail installation by automatically displaying or announcing the customer order number without the extra steps of typing in a paging number or using the public announcement system to announce that person's marker number or name.

In addition to providing the features and advantages described above, it is an object of the present invention to provide a paging system for customers in a fast service facility or fast service department which combines the feature of notifying customers by means of an audio or visual display that their order for service is ready to be delivered to them and that they should return to the customer counter or the delivery location.

Another object of the present invention is to provide such a system which allows correction of keyboard errors and reduces the number of premature alert signals while maintaining the overall function of maintaining prompt and efficient customer service.

A further object of the present invention is to provide a paging system which integrates with a POS system and received customer number display commands therefrom.

BRIEF DESCRIPTION OF THE DRAWINGS

Other objects and advantages of the present invention will be apparent from consideration of the drawing description in conjunction with the appended drawings, in which.

DETAILED DESCRIPTION OF THE PREFERRED EMBODIMENT

For clarity and simplicity, the present invention in this disclosure will be explained with reference to use of the invention in connection with a pharmacy located in a large retail store and which uses a sequential numerical system for the customer display markers. An advantage of the system is that it is compatible with existing procedures in many large pharmacies of this type. Such features and procedures frequently include giving the customer a ticket, coupon, or other paper on which there is a sequentially issued number, while this same number is applied to the customer prescription form from which the pharmacist will be working. Commonly the numbers from 00–99 are used for the sequence and this can be implemented with sequentially numbered tickets, sequentially numbered coupons, a "Bates" number stamp which stamps sequential numbers, with "twin checks" in the form of sequentially numbered pairs of self-adhesive labels, or in a simple case, a clerk may simply write a sequential number on a piece of paper or coupon and hand the paper to the customer while writing the same number on the prescription.

Figure 1:
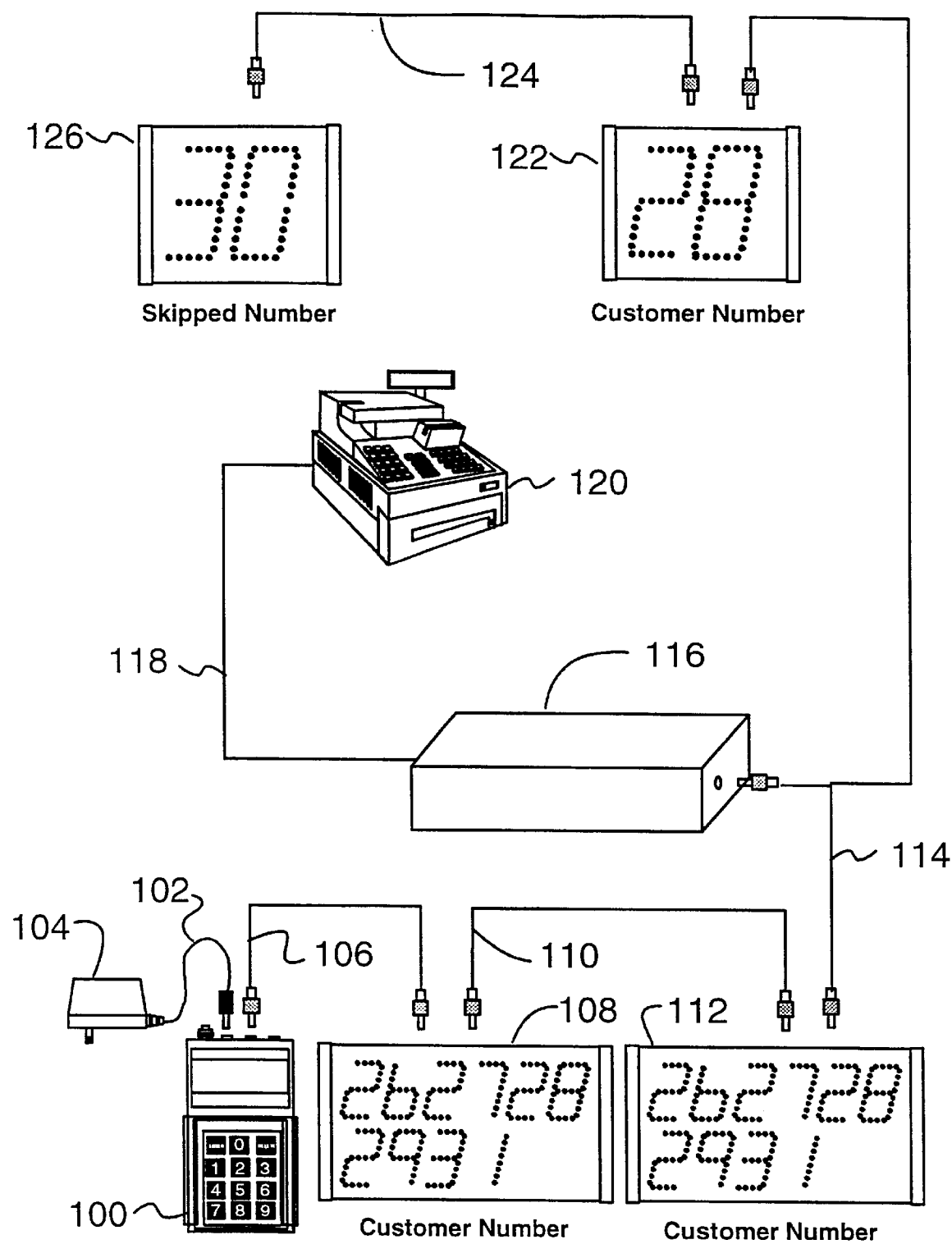
FIG. 1 is a partially schematic pictorial illustration showing a customer service control system, displays, and visual pager keypad according to the invention.
Figure 2:
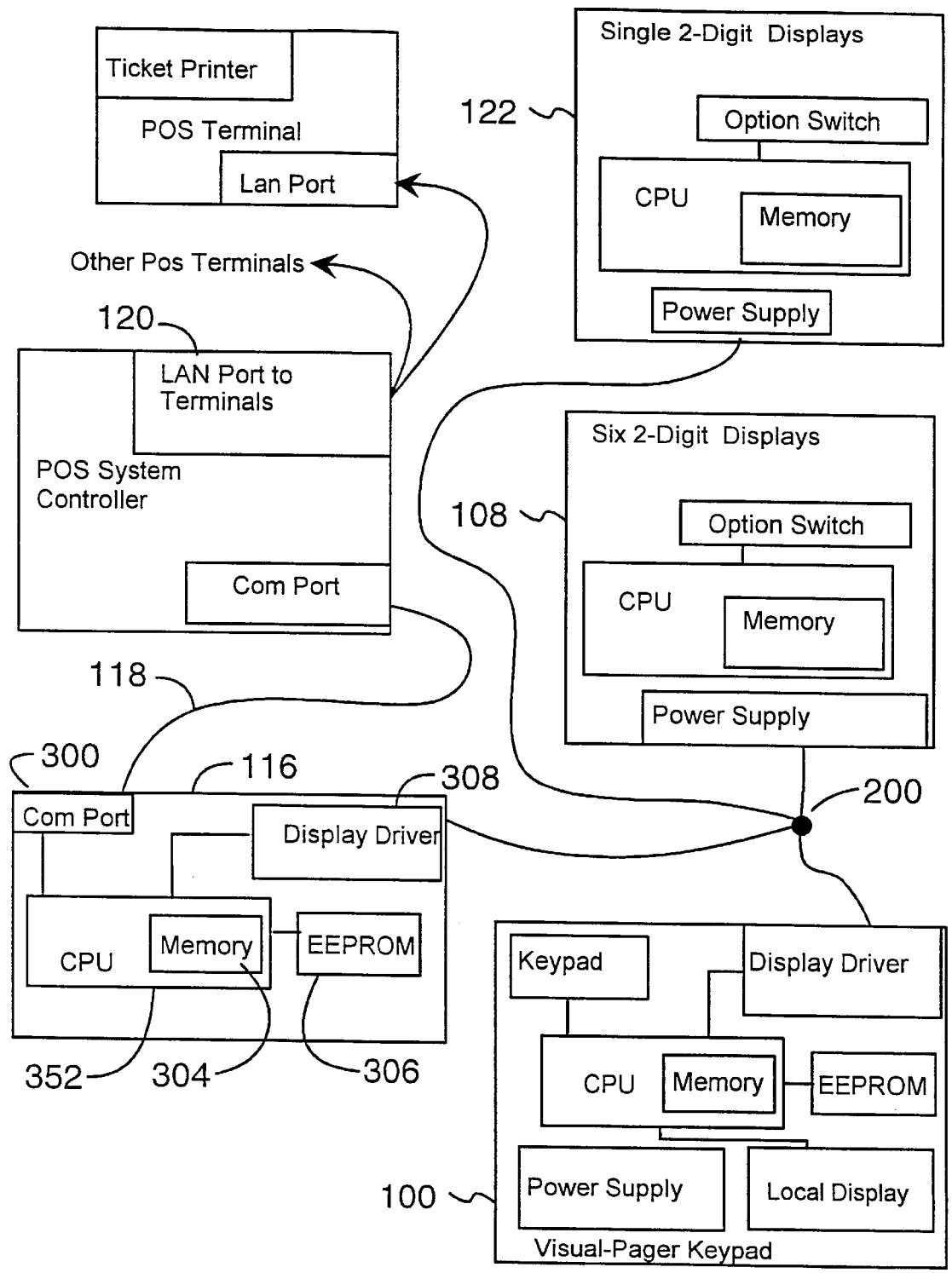
FIG. 2 is a schematic block diagram showing the customer service control system, displays, and visual pager keypad compatible to the apparatus shown in FIG. 1.
Figure 3:
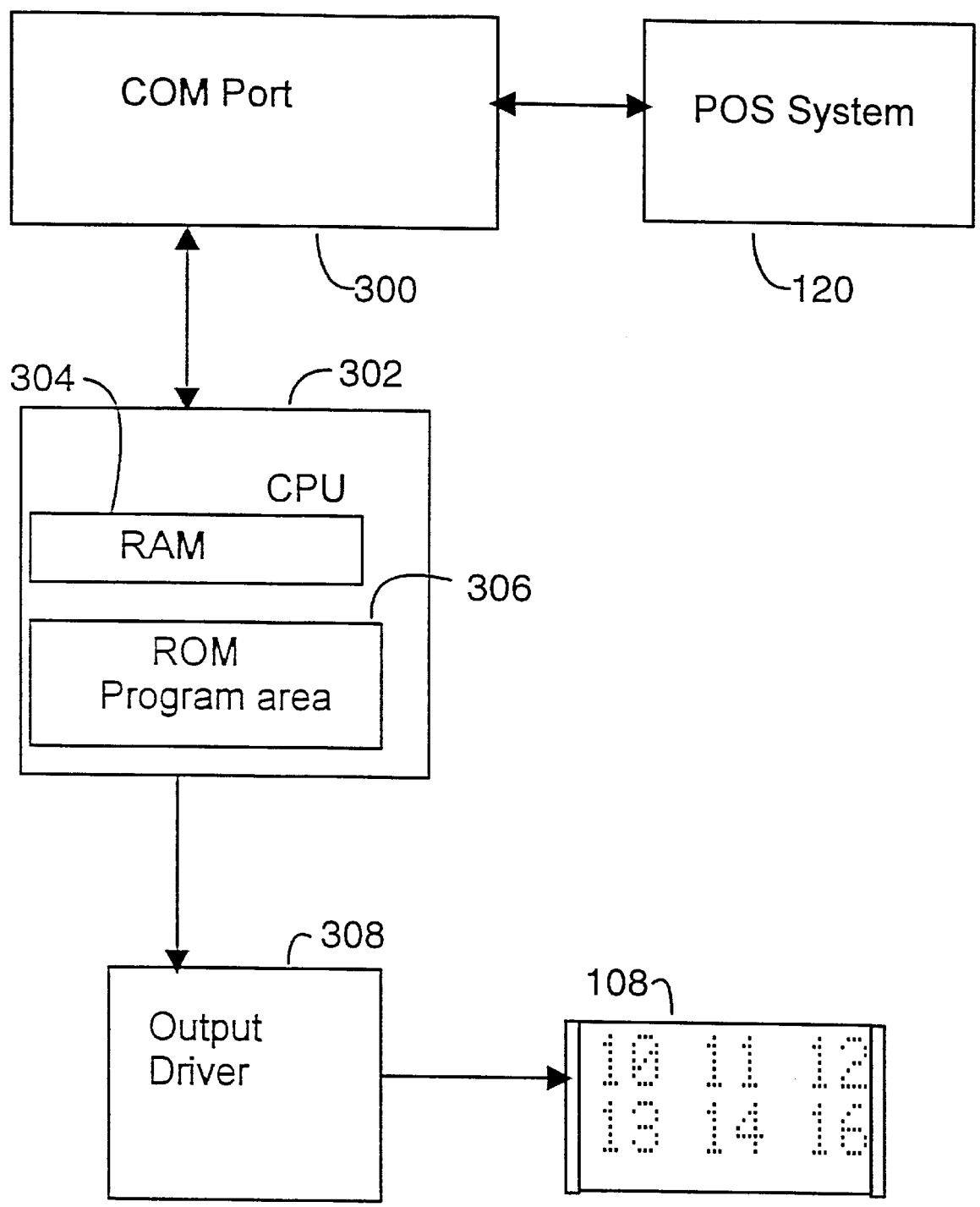
FIG. 3 is a schematic block diagram showing a POS (Point-of-Sale) control system connected to a customer marker number display according to the invention.
Figure 4:
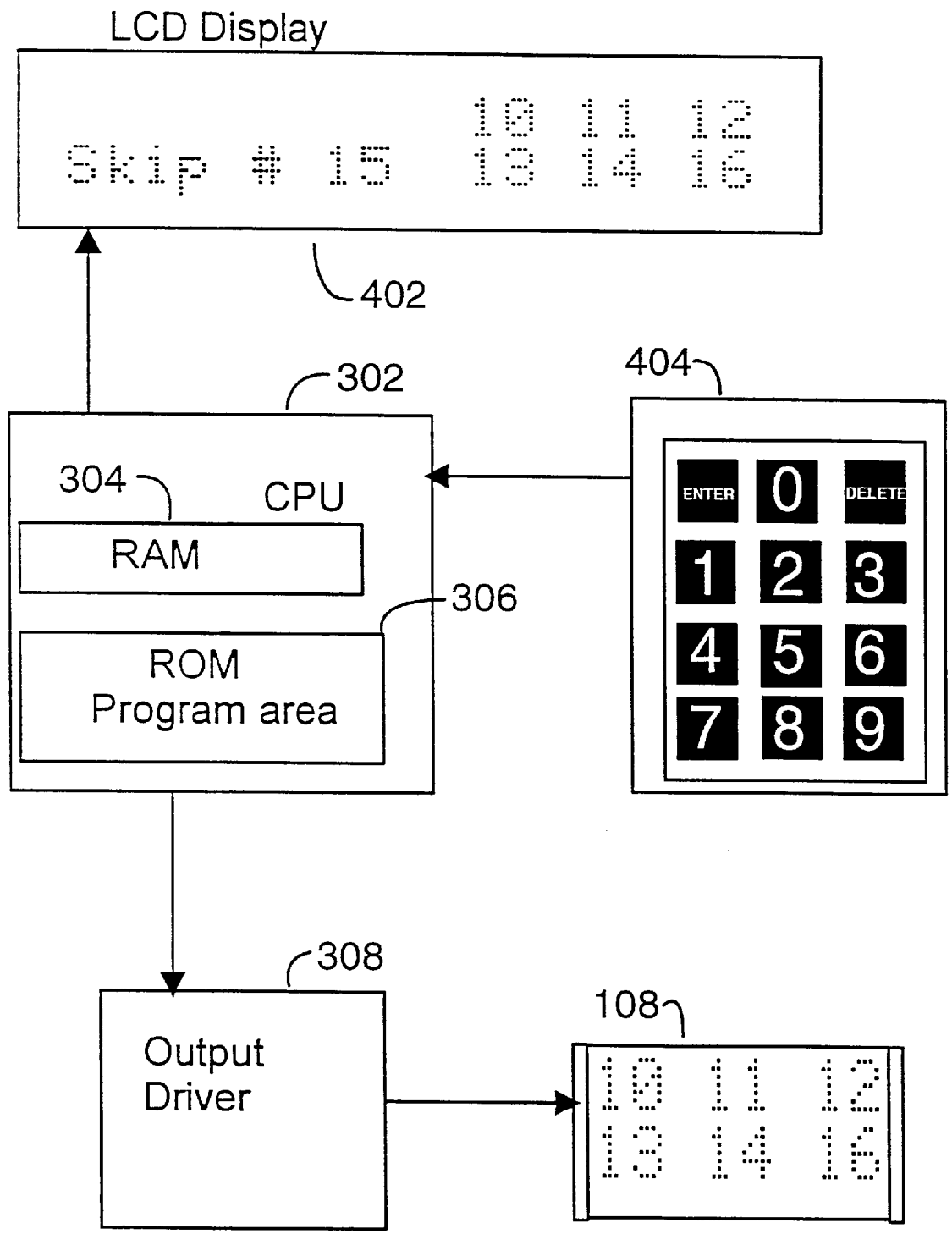
FIG. 4 is a schematic block diagram showing a customer service control system according to the invention having an optional skipped number display.

It being understood that Applicant's apparatus enhances one of the foregoing procedures, it will be seen that FIG. 1 shows an exemplary hardware implementation of the system (also shown schematically in FIGS. 2, 3, and 4). As shown in FIG. 1, entry and display module 100 is provided with a power supply 104 of conventional type which receives 120 v AC power from a conventional electrical outlet and supplies low voltage power through a cord 102 to the entry and display module 100.

Wide area display 108 (also known as a customer presence area display) is connected by a cable 106 with appropriate connectors to entry and display module 100. Cable 106 is preferably a coaxial cable such as RG59/U or 18 AWG wire pair, but any of numerous available wired or wireless communication means may be employed to communicate data from the entry and display module 100 and the CPU incorporated therein to wide area display 108. In many cases more than one wide area display 108 will be desired and as shown in FIG. 1 one or more additional wide area displays 112 may be provided and ganged together with wide area display 108 by a cable 110.

In many cases it will be desirable to connect a POS terminal to the system. As a feature of this system communication is handled by a common-bus arrangement, and each element may be connected into the system at any point. The connection of the POS interface into the system as shown in FIG. 1 is used to show that multiple units may be connected by a single cable. Therefore we show that the POS system controller 120 is connected by a cable 118 to a POS interface 116. The POS interface 116 is connected to wide area display 112 and single two-digit customer number display 122 by a cable 114. In many cases an additional single two-digit display will be desired for a skipped number display 126 which is connected by a cable 124.

FIGS. 2 and 3 show schematic diagrams of a system such as shown in FIG. 1. As shown in FIGS. 2 and 3, POS system controller 120 is connected to autopager interface 116 by a cable 118. Autopager interface is connected to the visual pager keypad 100, six-number two-digit displays 108, 112 and single-number two-digit display 122 by a system of cables 200.

FIG. 3 shows a schematic diagram of the connection between the POS System 120 to the autopager controller CPU 302 and its internal RAM 304, and ROM program area 306 through the COM port 300. The CPU 302 then drives the output display 108 through output driver 308.

FIG. 4 shows a basic form of customer service control system 400 including a central processor unit 302 which characteristically contains a random access memory (RAM) 304 and a read-only memory (ROM) 306 a portion of which is utilized to store the software program for carrying out a method according to the invention.

A keypad 404 is provided which may be of very simple form having only the decimal digits 0–9 and an enter and a delete key. It will be understood that a more complicated keypad could be employed, and, in fact, the function of the CPU 302 and the keypad 404 could be executed by a conventional, standard desktop or notebook computer programmed for the enablement of the method according to the invention.

A small alpha-numeric display 402 is provided for local display of information to the pharmacist, and, as will later be described, the CPU 302, the display 402, and the keypad 404, may all be incorporated in a small notebook size housing. The display 402 could be more or less elaborate and its function could also alternatively be implemented in a personal computer.

An output driver 308 is provided to transmit appropriate signals to a remotely located wide area display 108. The output driver 308 and the wide area display 108 may be similar to units employed in a prior McCullough system without a customer service control feature.

Figure 5:
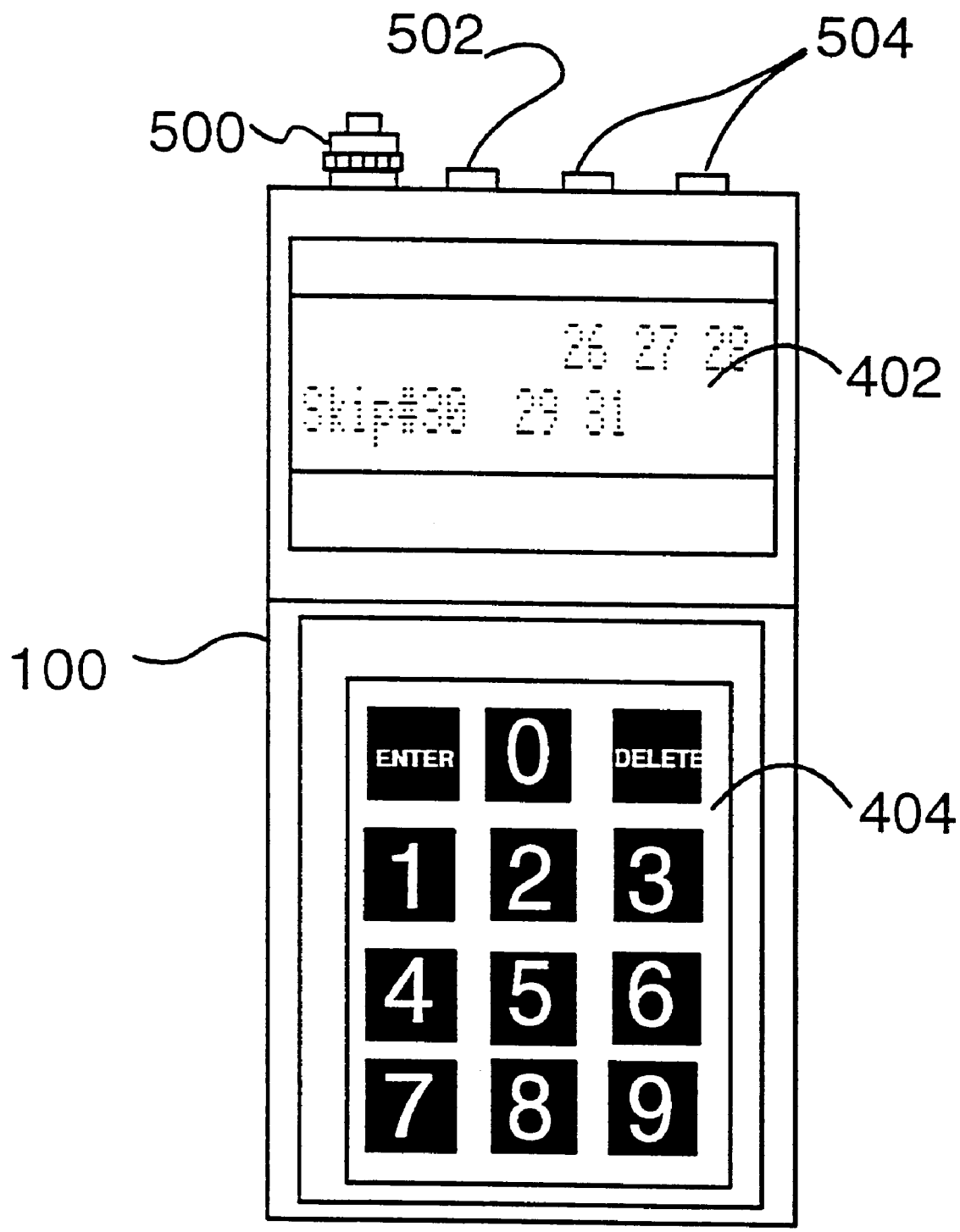
FIG. 5 is an enlarged plan view of the combined keypad local display unit shown in FIG. 1.

FIG. 5 is an enlarged plan view of the exterior of the entry and local display module which may incorporate the microprocessor and other components necessary for the central processing unit of the system. As seen in FIG. 5, entry and display module 100 is provided with a small local display 402 which may be a liquid crystal numerical display or any other suitable form of data display unit. As illustrated the local display 402 is capable of displaying six two-digit numbers indicating ready task identities together with a skipped number legend and one two-digit skipped number associated therewith. The capability, configuration, and size of the display 402 is a practical one but is arbitrary and subject to wide variation. The provision for ready task numbers could be enlarged or diminished and the skipped number portion of the display could be omitted or modified to show more than one skipped number as desired. Common, well-known features for displays such as flashing numbers, different colors, or the like could be incorporated if desired. The entry and display module 100 is provided with a simple keypad 404 as previously discussed and also is provided with power jack 502 and data output jacks 504 for communicating data signals to wide area display 108 or other receiving devices.

Figure 6:
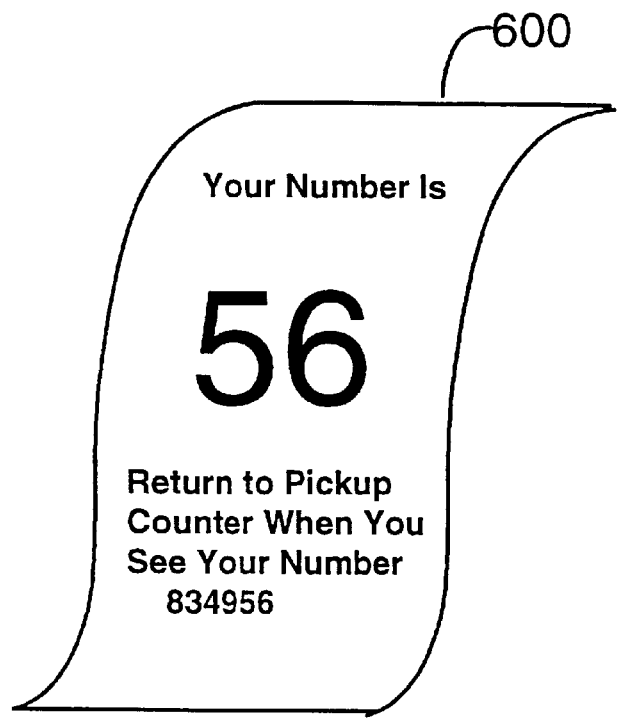
FIG. 6 is a pictorial illustration of a rendering of a form of customer ticket with a customer marker number.

FIG. 6 is a pictorial representation of a simple ticket printout 600 for a customer which contains his customer marker number.

Before describing the details of the method of the invention and the computer program which implements it, it is useful to describe an example of the way that the system operates in a particular environment, for example a pharmacy department in a large retail store.

An example would be as follows: As each customer comes to the pharmacy to drop off their prescription, they are assigned a number. This can be done in one of several ways. For example, the clerk could tear off a number (random or sequential) from a ticket roll, write the number on the prescription and give the ticket with the number to the customer to retain as she shops. As a preferred procedure, the clerk can press a key marked "new prescription" causing the POS terminal to print off a ticket with the unique customer control number (usually sequential, or, in some cases, unordered) printed on it. The POS system assigns a unique number to the customer such as 834956. The customer paging number may be the last two (or three) digits of this unique number, e.g., 56. Using only the last two digits does not cause a problem with duplicate customers being paged at the same time, because in the usual environment there are never more than 100 customers (numbers 00–99) with prescriptions that are ready but not picked up. The clerk will usually enter the customer name into the POS terminal and other pertinent information. Finally, the clerk will insert the customer's prescription into the POS terminal and the POS terminal prints the number directly onto the customer's prescription Once the customer has been assigned a control number, the number is communicated to the customer by either handing a ticket with the number to the customer and/or verbally informing the customer of their control number. Once the customer has been informed of his number, the customer is encouraged to wander about the store or shop for other products. After control number assignment, whatever the procedure, the prescription information, along with the customer number (possibly in bar code form) is routinely placed into a "to-be-filled" basket for the pharmacists. The POS terminal may also pass the customer number to the POS system interface. Once the pharmacist fills the prescription, the pharmacist ENTERS the customer paging number previously assigned to the customer for transmission to the Visual-Pager system which passes the 5 byte hexadecimal code to the Visual-Pager such as: 73,35,36,14,24. The break down of the 5 byte ASCII data stream to the Visual-Pager from the POS System may be as follows:

73=ENTER this number
35=5
36=6
14=POS station 14
24=Checksum

This entry can be automated by means such as a bar code reader, or can be done by typing the information into the system via a keypad (either a number keypad or the POS terminal keyboard). As the Visual-Pager system receives the commands and numbers from the POS system or the keyboard each number received is added, by ENTER, (or removed by DELETE as will be later discussed) to a number stack in computer memory. A timer cell is associated with each number that is entered for implementing the AUTO DELETE function. At regular intervals the timer cell for each number is updated to determine if it has "timed out". If that number is "timed out" it is then removed from the stack. At pre-programmed intervals, like every 3 seconds, the number paging number stack is searched for the next set of numbers to be displayed on the large customer displays.

If one of the pharmacists skips a number (customer order) then this number is recorded and after a preprogrammed delay it is displayed on the keyboard or a larger display for the clerk's attention. Both the software and the hardware are much the same in both the visual pager interface and the keypad system. As the Visual-Pager system rotates through displaying all of the numbers on the stack, it will eventually display the last entered number. This causes the customer's control or paging number to be passed on to one or more large displays that are easily viewed by waiting customers throughout the store. If the system has the auto announce feature, it would announce the person's number over the public address system or sound a pleasant chime tone to alert pharmacy customers to notice the new number on the visual pager display. The customer sees that their number is being paged, and returns to the pickup counter to pick up and to pay for their prescription. The customer presents their number or name and the clerk recalls all of the information about this order including price and paging number on the POS system. This number is then automatically passed to the visual pager software as a number that is to be deleted. As the transaction is completed the POS terminal passes customer order code to the POS System which passes 5 byte hexadecimal code to the Visual-Pager such as the following:74,35,36,14,24.

The break down of the 5 byte ASCII data stream to the Visual-Pager form the POS System may be as follows:

74=DELETE this number

35=5

36=6

14=POS station 14

25=Checksum

This completes the primary functions of the POS system and other actions may be handled by the Visual-Pager system. The visual pager software then deletes the number from the display stack which causes that number to no longer be displayed. This completes the essential functions of the Visual-Pager system.

Alternatively, the visual pager's optional auto delete system can be set to delete any customer page numbers which have been displayed for a preprogrammed length of time, like 90 minutes, assuming the customer has left the store to return later. The visual pager also has a skipped number feature which notifies the pharmacist if a customer number has been skipped. This skipped number can be displayed on the keypad or a larger two digit display in the pharmacy area.

A further example including the skipped number feature would be as follows: Patient A comes into a pharmacy to fill his prescription. He proceeds to the pharmacy counter and presents his prescription to the clerk who hands Patient A ticket number "10" and instructs him to watch for his number on the RX READY sign in the center of the store. The prescription is then put in the "waiting" bin to be filled in its turn in accord with usual practice. Patient A proceeds about his shopping and occasionally glances at the RX READY sign to see if his number is being displayed. Patient B comes in with a prescription and likewise proceeds to the pharmacy counter and receives ticket number "11". Patient C does the same and receives ticket number "12". Finally Patient D does the same and receives ticket number "13".

A pharmacist by this time has filled Patient A's prescription and types "10", "ENTER" on the keypad. Patient A notices his number which is then shown on the RX READY display and proceeds to the prescription pick-up counter to get his prescription.

A pharmacist working on Patient B's prescription notices that he needs more information from the doctor. The pharmacist places a call to the doctor who is busy but will return the call shortly. The efficient pharmacist does not wait for the return call and starts on Patient C's prescription, fills it and types "12", "ENTER" on the keypad. Patient C will see the resulting page and proceed to the prescription pick-up counter to get his prescription. At this point the service monitoring feature of the method and apparatus of the invention becomes effective by recognition of the out of sequence paging number from the keypad. A pharmacist then starts on Patient D's prescription. When Patient D's prescription is ready and the pharmacist types in "13" to page Patient D, he will notice that the keypad shows "SKIP #11" if it has been longer than 5 minutes since Patient C's "12" was typed into the keypad. This serves to remind the pharmacist who forgot about the return phone call from Patient B's doctor. The pharmacist needs to act on the skipped patient whether it is to call the doctor back or advise Patient B that there is a problem with the prescription. Let's say that the pharmacist calls the doctor back, clears any uncertainty and fills Patient B's prescription. When B's number "11" is entered into the keypad then the "SKIP #11" message disappears because that customer has now been serviced and his number deleted from the skipped number register.

In this description, for the sake of simplicity, it is assumed that each customer has only one prescription, or other goods or service order (task), to be fulfilled; hence, the terms customer order number, task number, and customer number are used interchangeably. It will be understood that should a customer have two prescriptions. for example, each may be given its own task order number, and, hence, it is possible for one customer to have two "customer numbers". Furthermore, the invention contemplates that while "customer numbers" will be numeric data elements of two or three digits, alphabetic or alpha-numeric markers could be employed. Hence, "marker" will also be understood to include "customer number" and its equivalents.

There are nine distinctive areas of this disclosure: 1) Selecting a customer number; 2) Relating number to customer order; 3) Communicating customer number to customer; 4) Broadcasting such number to customers when order is ready; 5) Deleting such number when order is picked up; 6) Interfacing with store POS system; 7) Notifying the clerk of a skipped number; 8) Allow for making an audible announcement or chime on entry of new number; and 9) Allow for multiple keypads with automatic master/slave detection. Each of these will be will further explained in the following discussion.

1) Selecting a Customer number. There are two ways a number can be selected: sequential or non-sequential. Sequential number assignment can occur when the POS system is assigning sequential transaction numbers to each customer order as it is placed (independent of how many different POS systems are taking orders at one time). It can also occur when the clerk simply tears a sequentially numbered ticket off of a roll of tickets and hands this ticket to the customer. Non-sequential numbers can be assigned when each POS terminal has it's own transaction number. As an example POS terminal 1 assigns customer numbers 01 through 50. POS terminal 2 assigns customer numbers 51 through 99 . Thus, the first two customers could have numbers 01 and 51 if each one is handled by different terminals. Assignment can also occur when two or more clerks are dispensing tickets from different rolls at different locations at the same time. These tickets should have non-duplicate numbers in the same manner as the terminals described above.

2) Relating Number to Customer Order. There are various ways to relate the selected number to the customer order data.

In one preferred procedure, the customer presents their prescription to the clerk who presses a "New prescription" key or similar key on the POS terminal. The POS terminal prints an assigned number on a receipt which is given to the customer to be kept while waiting. The clerk inserts the prescription into the POS terminal which prints this same number on the prescription. (This operation is much like that of a customer bank check being inserted in a POS terminal for coding.) The above procedure ties the customer number and the prescription together while being processed. In case the order is a refill the clerk may simply take a standard form and fill in the customer name and refill number and insert this rather than the prescription in the POS Terminal to be printed with the customer number.

In an alternative procedure, the clerk assigns a number by tearing it off a ticket roll or using another form of sequentially numbered coupons. Then the clerk may enter that number after pressing the "New Prescription" key. The ticket or coupon number then becomes the "customer paging number".

3) Communicating Customer Number To Customer. While the customer number may be verbally communicated by the POS terminal operator, it is preferably also communicated to the customer by the POS terminal generating a numbered receipt which is given to the customer, or a preprinted numbered ticket or other item may be given to the customer.

4) Broadcasting such number to customers when order is ready. As the prescription is filled the customer order number is passed to the Visual-Pager system, normally when one of the pharmacists types the customer number into a keypad near the completion station. The Visual-Pager system stores the just paged number in memory. This is accessible memory which is searched periodically, typically every preprogrammed time period, looking for the next number to be displayed. If a number is found it is transmitted to large remote displays which may be similar to those shown and described in U.S. Pat. No. 4,992,774. The Visual-Pager stores more numbers than would normally be necessary, a practical limit being around 100 different waiting customers' numbers (if the rollover time is 3 seconds between numbers).

5) DELETING Such Number When Order Is Picked Up. When the customer returns to the pickup area and presents their order number after they see or hear their page, the clerk types in their order number. The prescription total (if not already entered by the pharmacist) may be entered at this time. The POS system immediately passes the customer order number to the Visual-Pager system with a code to signify this number is to be deleted from the Visual-Pager memory. The Visual-Pager deletes if from the memory and which removes it from the large remote displays visible by waiting customers.

6) Interfacing with store POS system. The system can be integrated through standard electronic means to allow the POS system to control the Visual-Pager system. A simple interface allows for the entry of numbers, while a full interface would allow for the POS system to control the input, output, and changing of system configurations for the visual-pager system.

7) Notifying the clerk of a SKIPPED NUMBER. If a customer page number is skipped during the course of serving many people through the day then the present system will allow a preprogrammed time to elapse (such as 5 minutes) after which it displays the skipped customer number to the pharmacist who can then give attention to the skipped customer.

8) Making an audible announcement or chime on entry at new number. Each time a new page number is entered that number is broadcast on the signal to all displays. If there are several screens of 6-two-digit numbers being displayed, it is possible that when the latest customer page number is entered it will not be immediately shown on the screen. The optional software included in the display monitors the line for any new customer page entries and records them in memory in the display. Each time another set of current numbers is received to be displayed they are compared to the new entry already received. If there is a match, then this is the first time this number is being displayed, a (approximately 200 millisecond) contact closure is made to sound an external door bell type chime or trigger an audible announcement of that number. The new page entry is then deleted from the memory.

9) Allows for multiple Key pads with automatic master slave detection. The system can also have an important feature which allows for multiple master keypad units to be used on the system by placing the additional units into the "slave" mode of operation. Thus, the system regulates itself and ensures that there is only one "master" station on line.

The method of operation of the system apparatus will be seen from FIGS. 7 through 19 and the following description.

Figure 7:
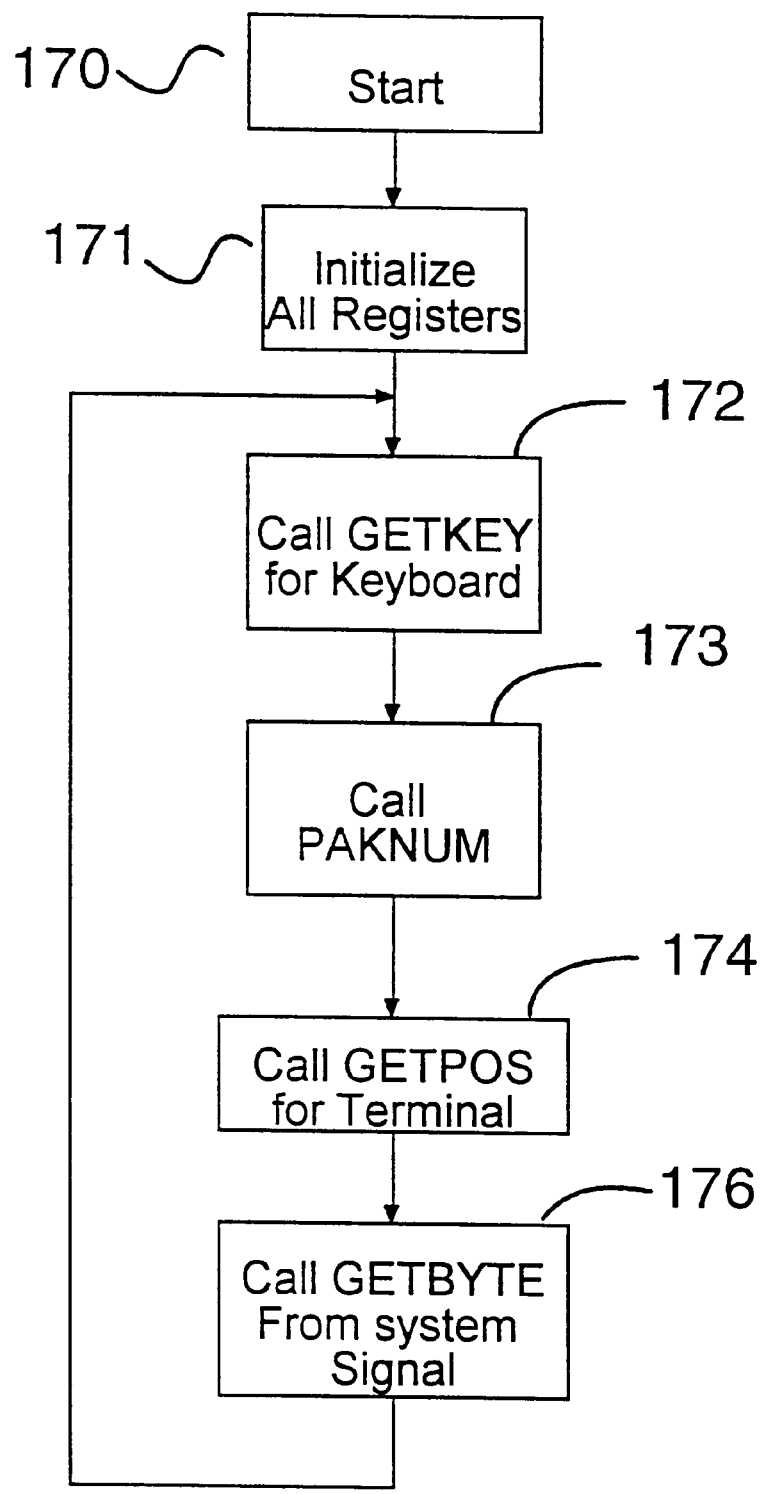
FIGS. 7, 8, 9A, 9B, 10–17, 18A, 18B and 19 are flow charts useful in explaining the implementation of the method of the invention with computer software.

FIG. 7 shows the main controller program routine.

Figure 8:
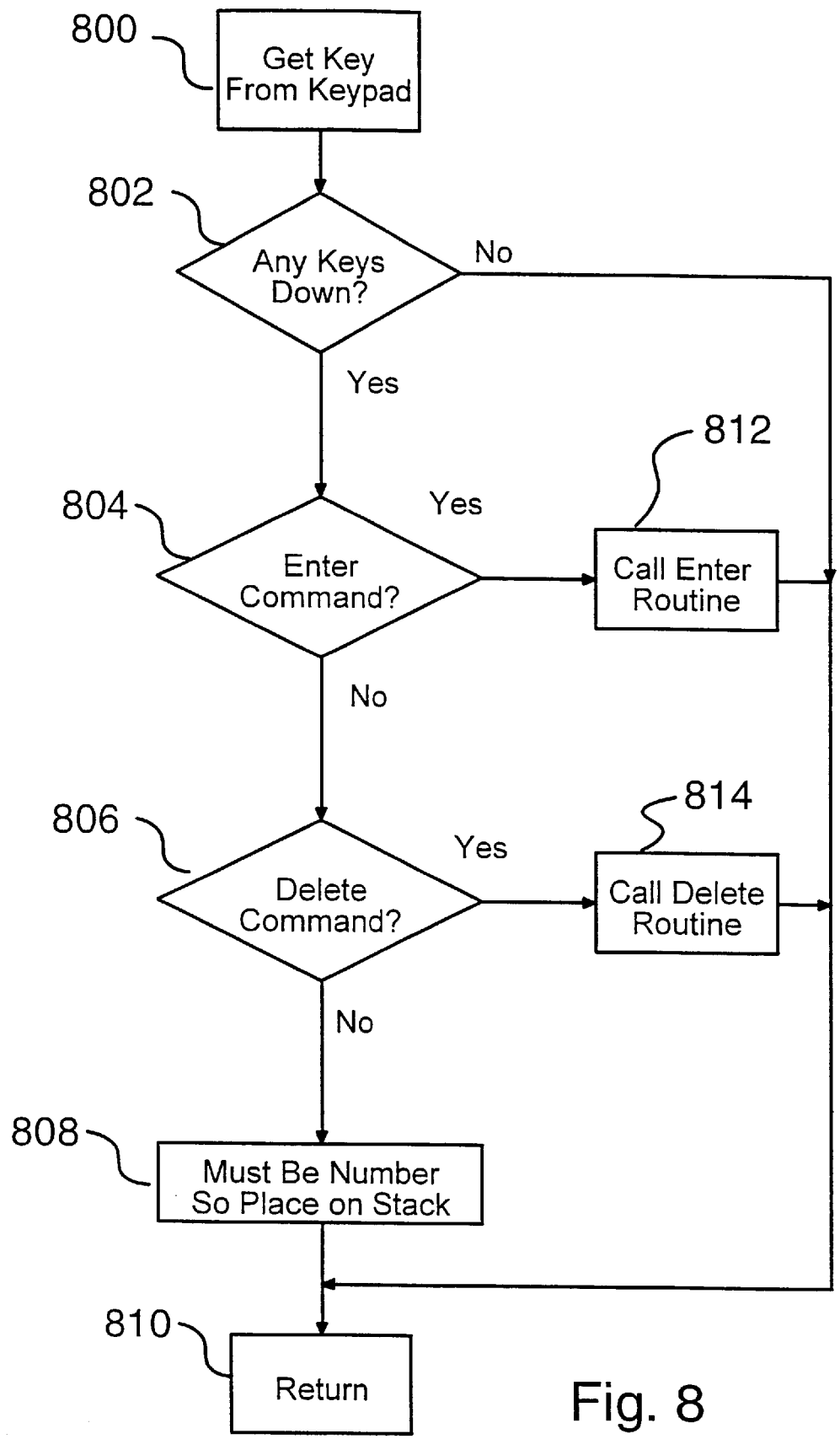

FIG. 8 shows the get and process any key down routine.

Figure 9A:
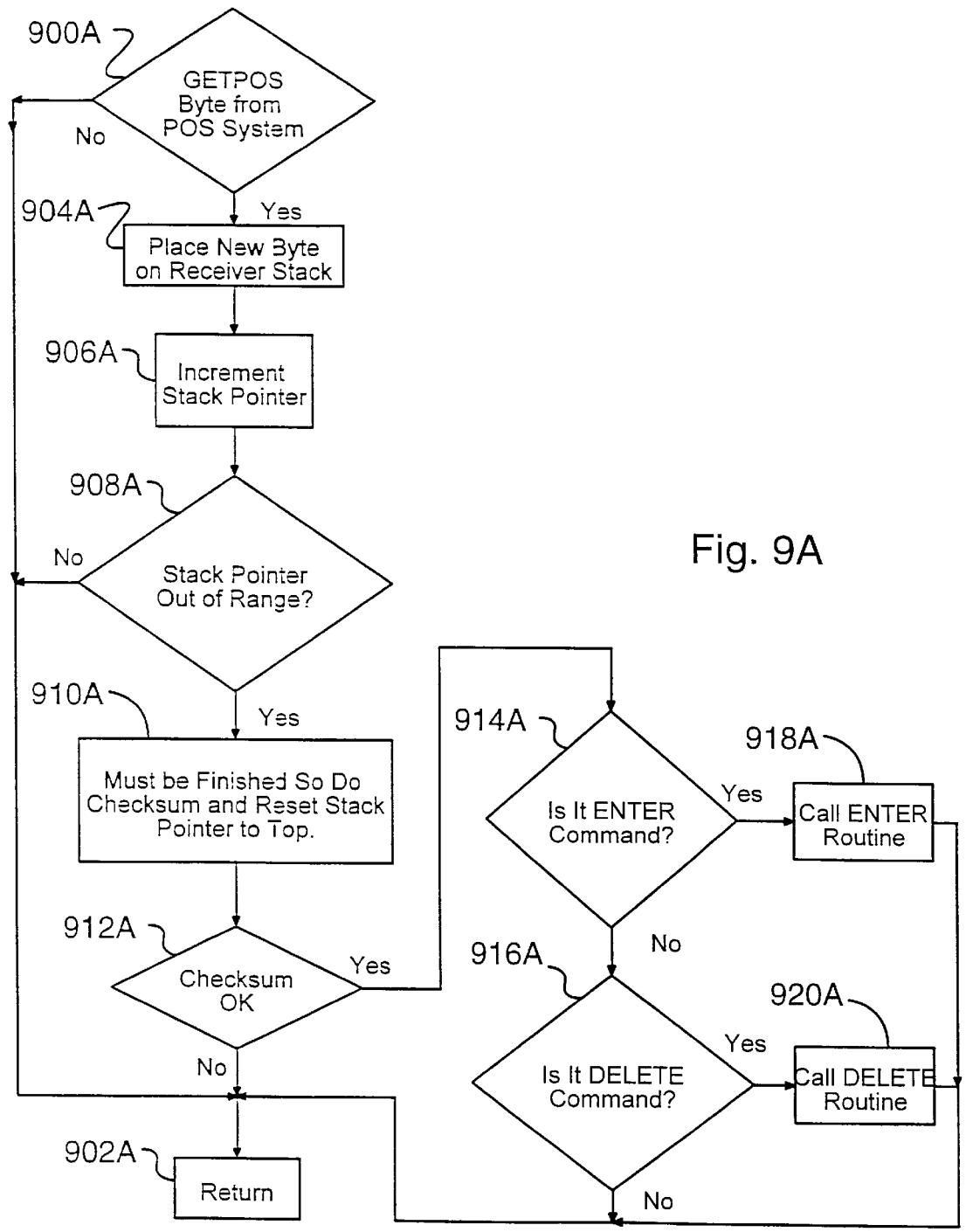

FIG. 9A shows the command processor for autopage POS interface routine.

Figure 9B:
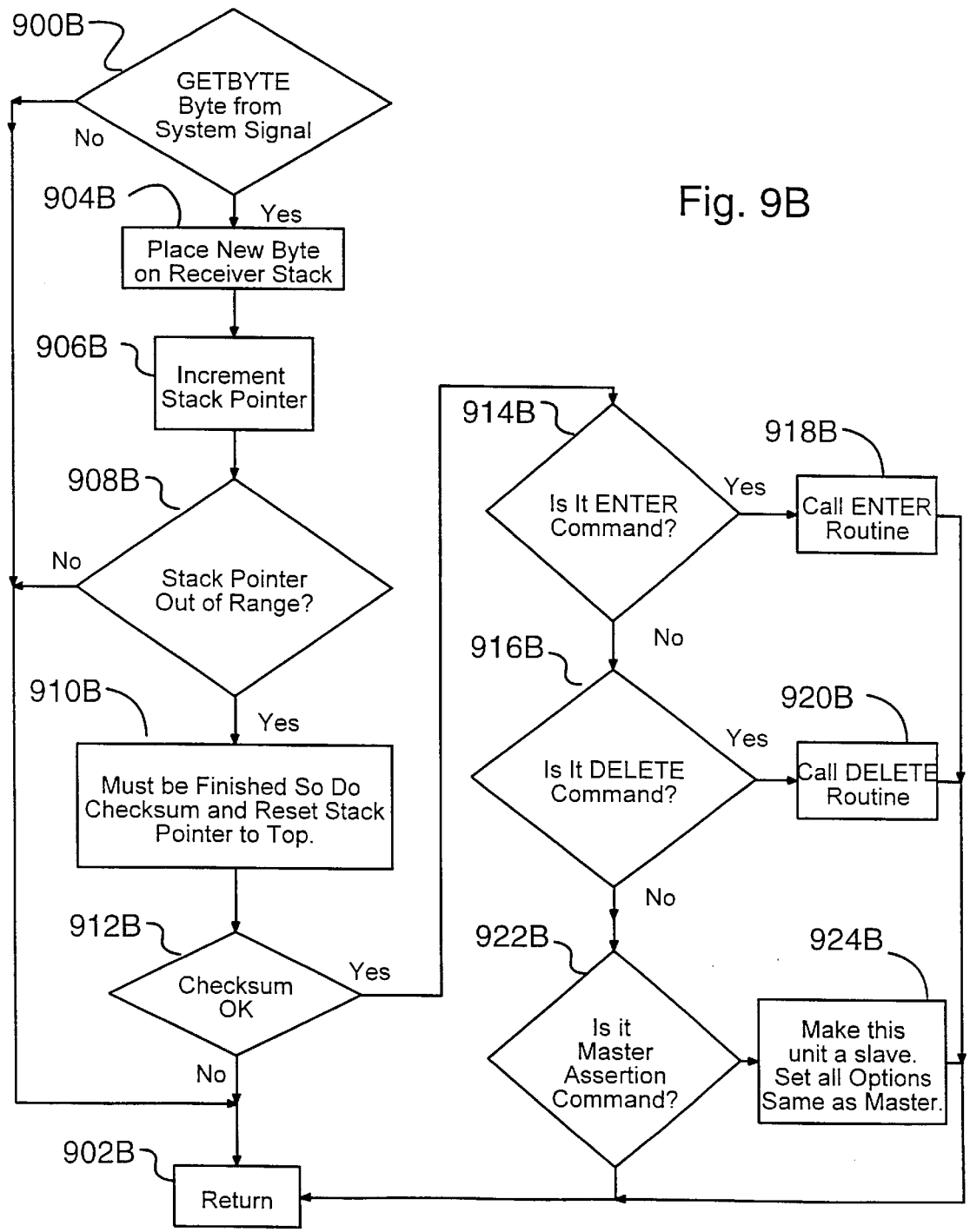

FIG. 9B shows the information transfer routine between slave units and master unit (GETBYTE from system signal routine).

Figure 10:
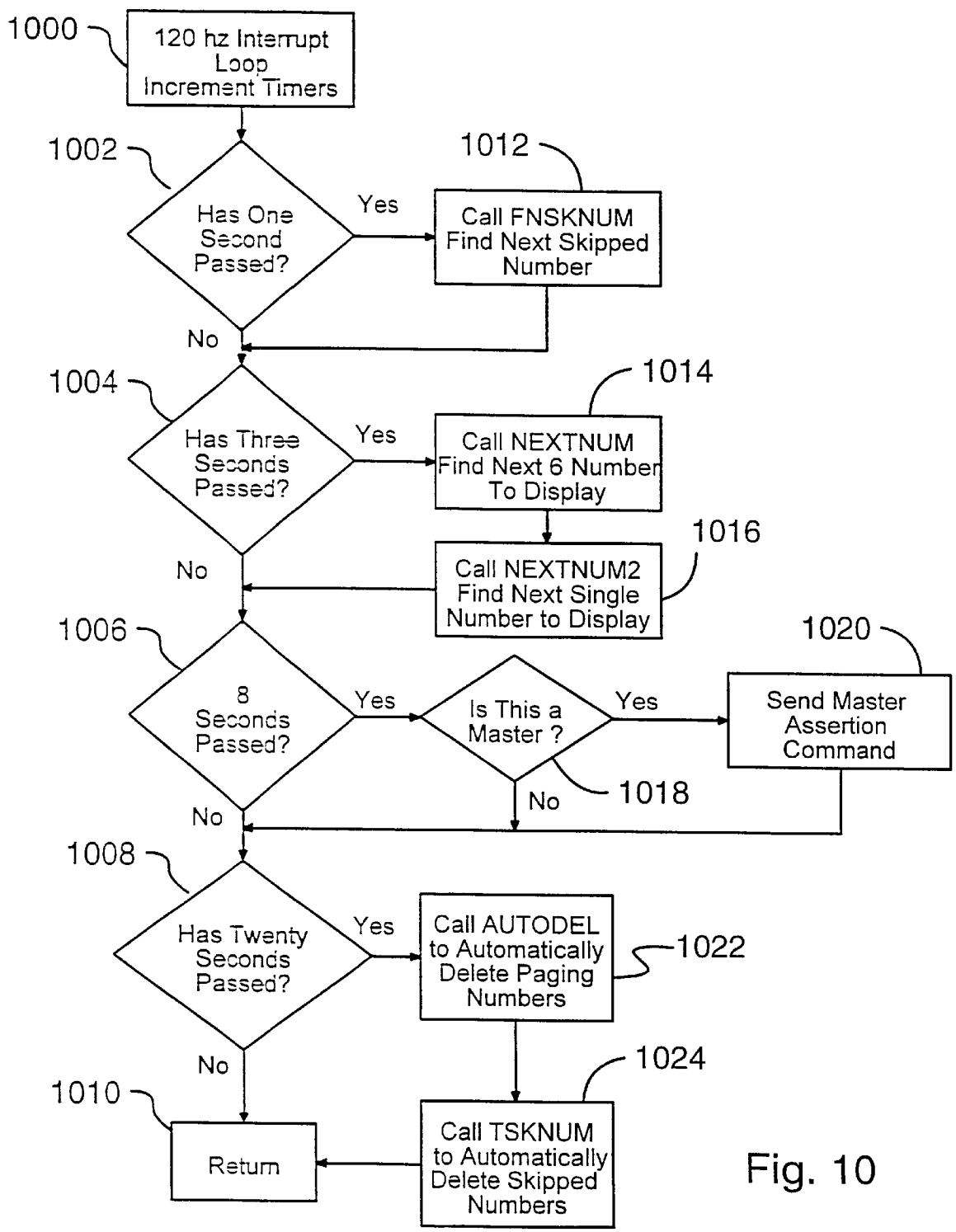

FIG. 10 shows the interrupt timer loop that calls various programs routine.

Figure 11A:
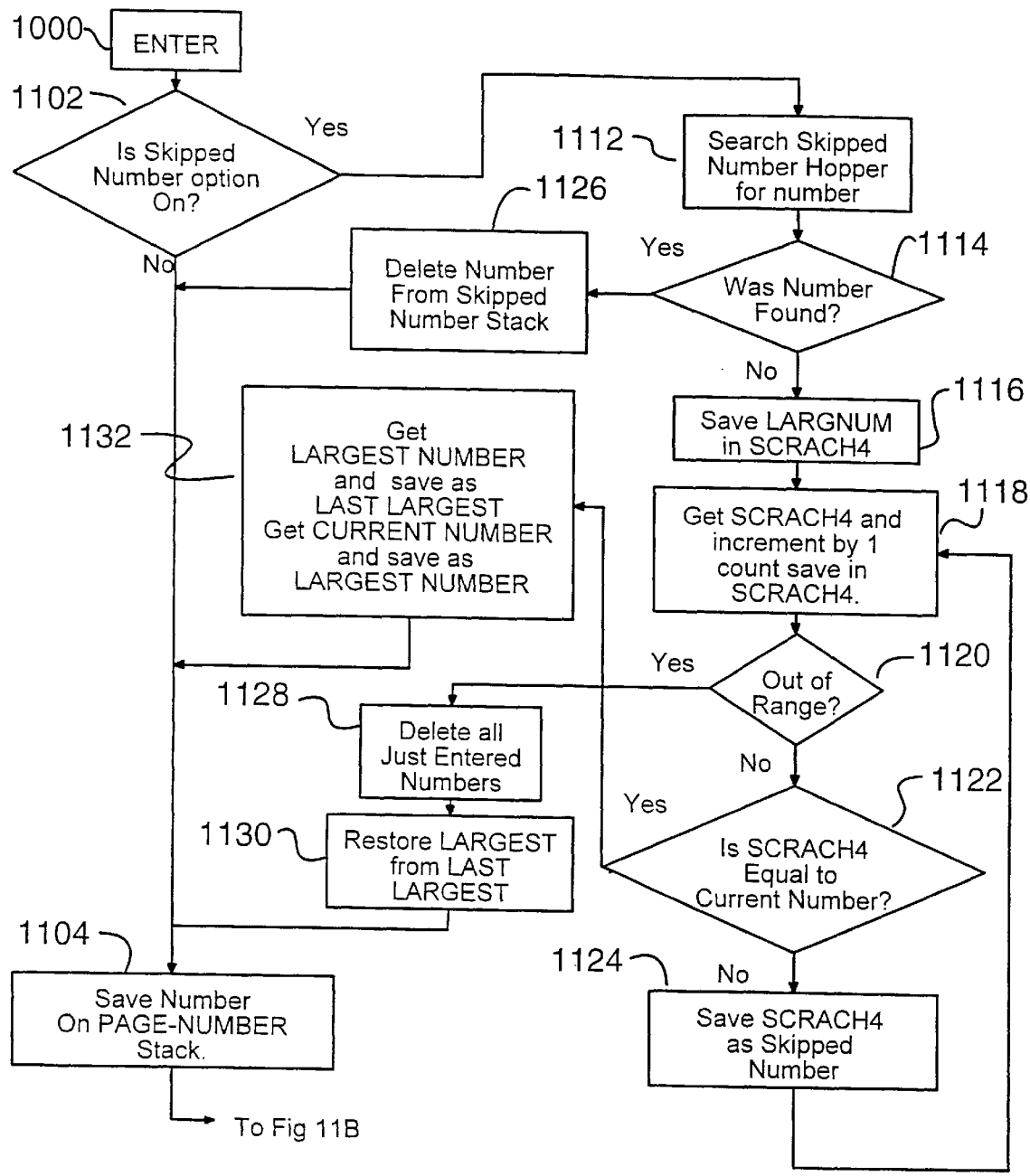
Figure 11B:
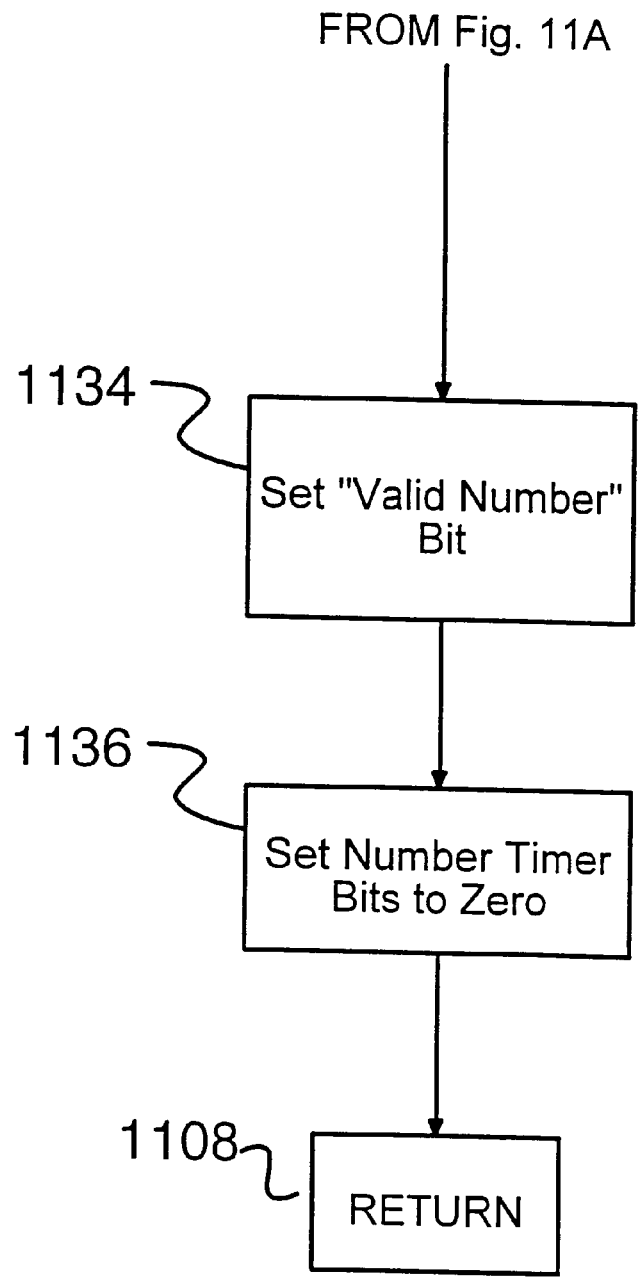

FIGS. 11A and 11B show the enter number and save skipped number routine.

Figure 12:
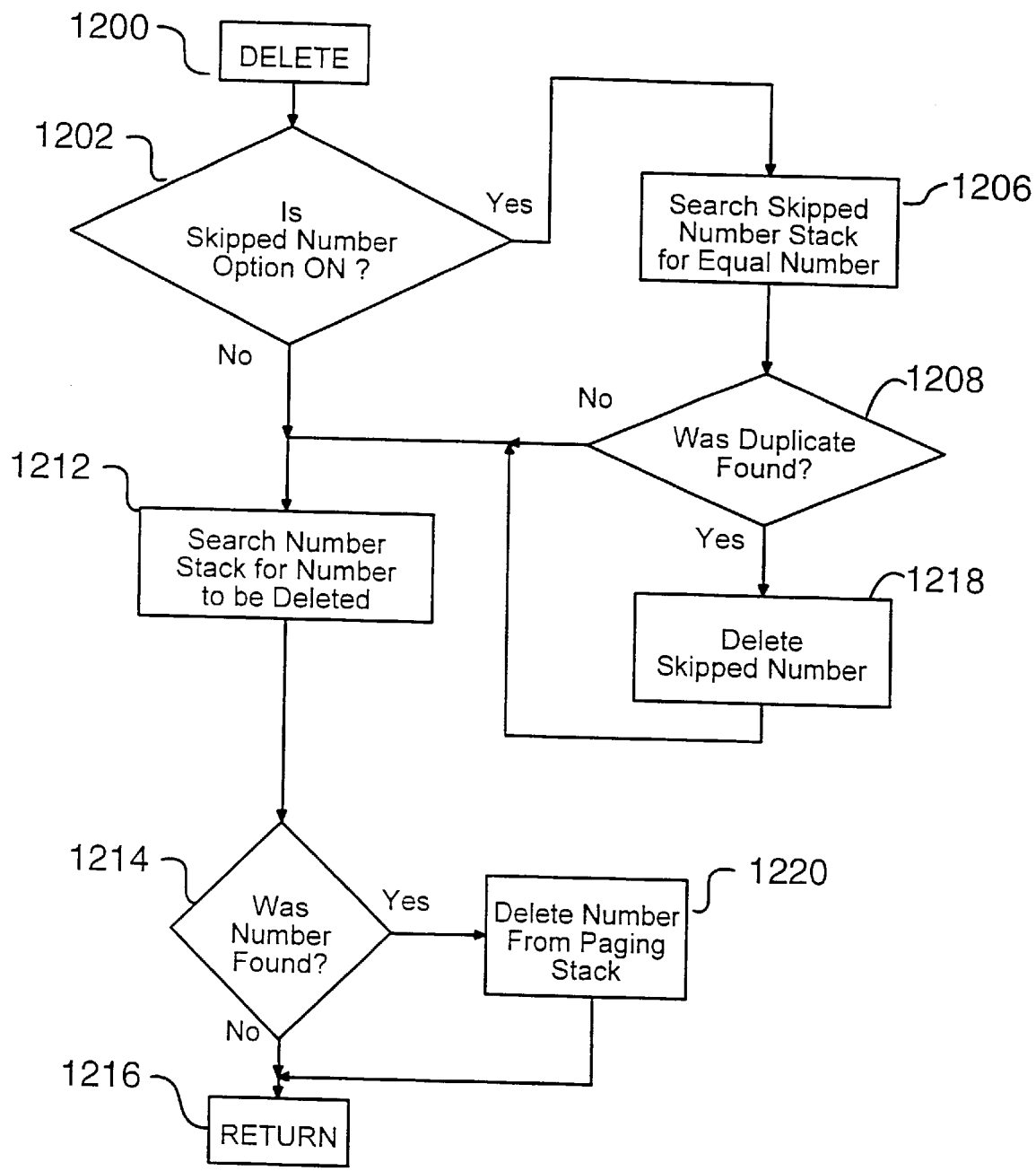

FIG. 12 shows the delete number and delete skipped number routine.

Figure 13:
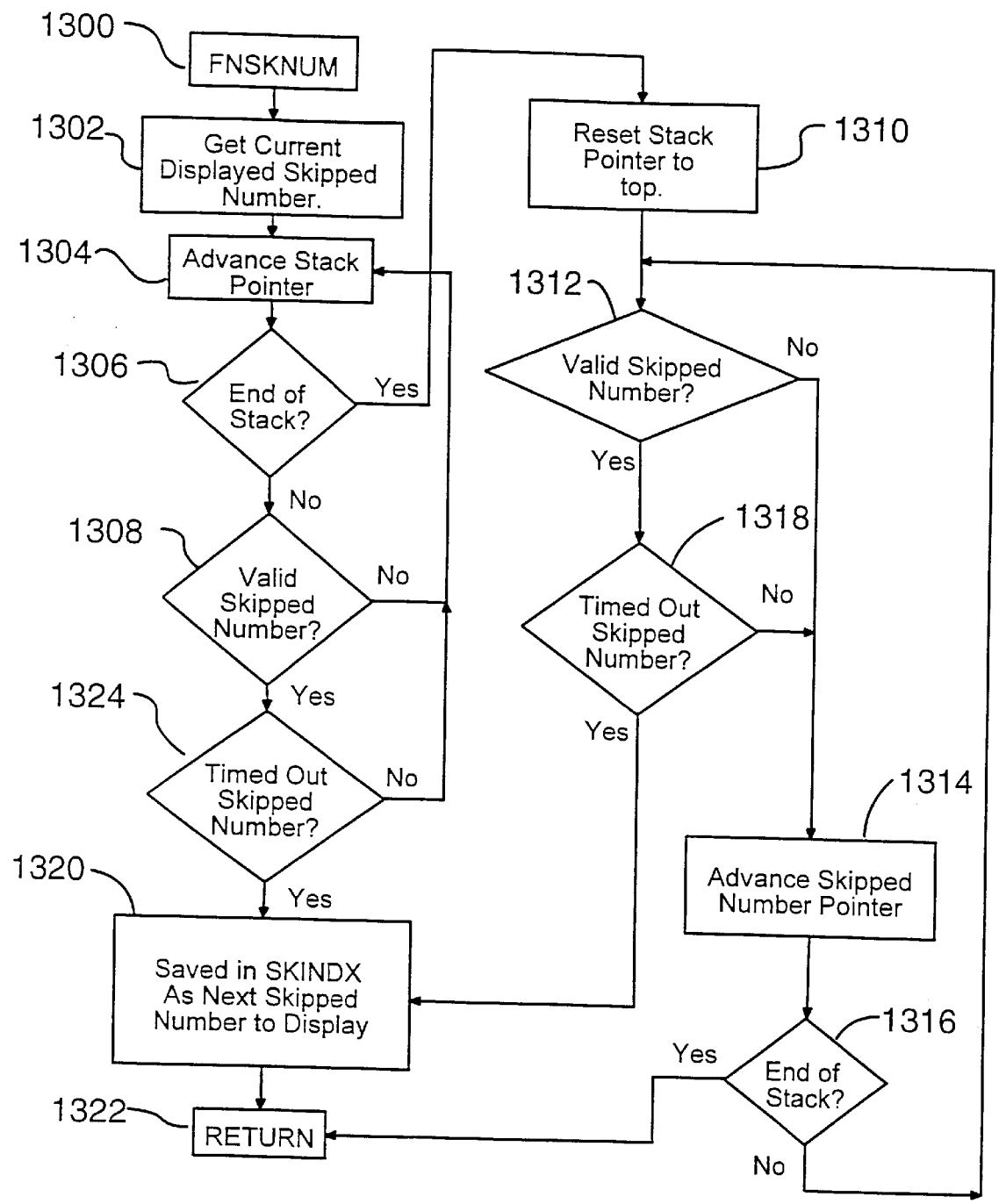

FIG. 13 shows the find and display timed out skipped number routine.

Figure 14:
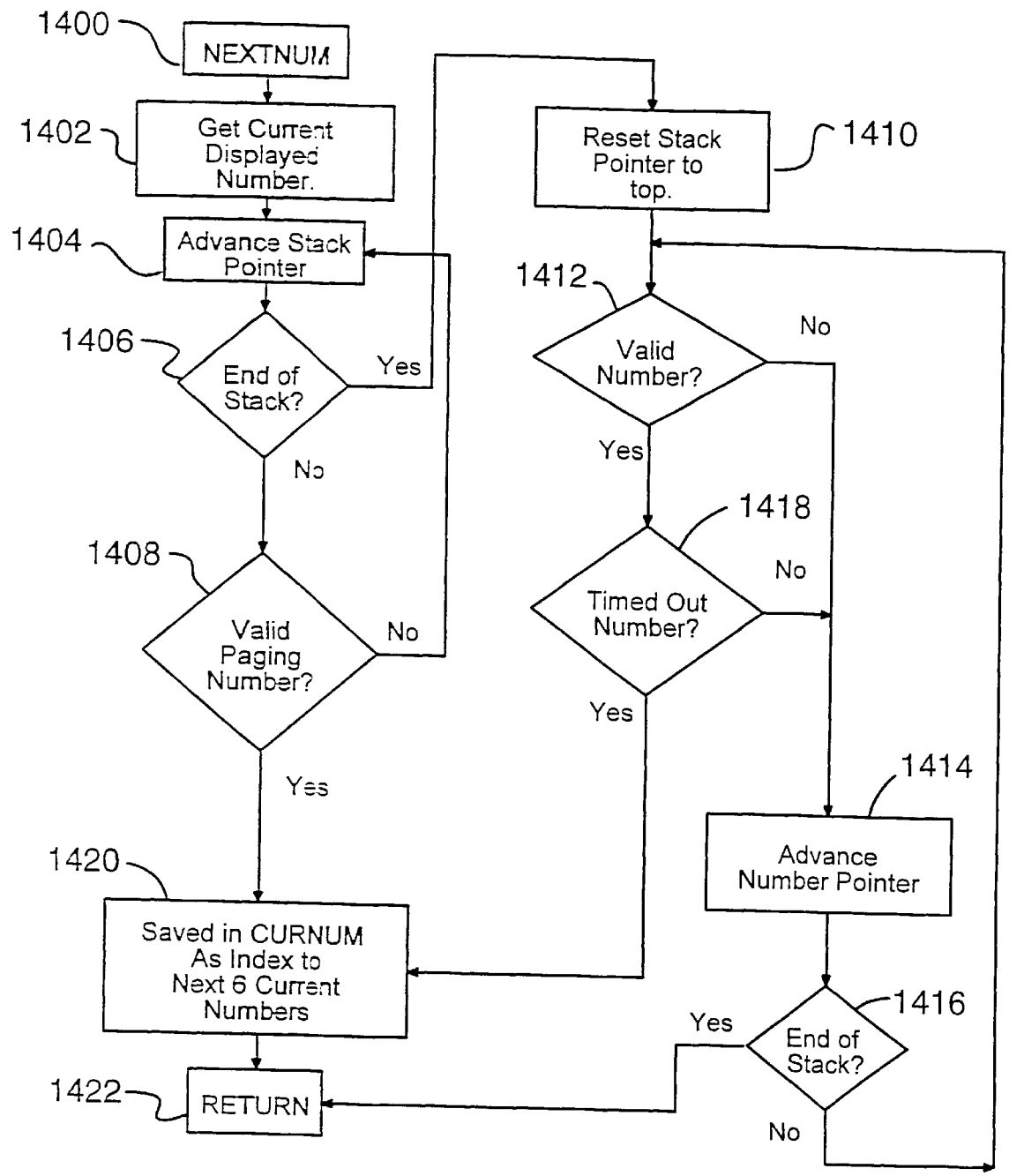

FIG. 14 shows the find next 6 number index routine.

Figure 15:
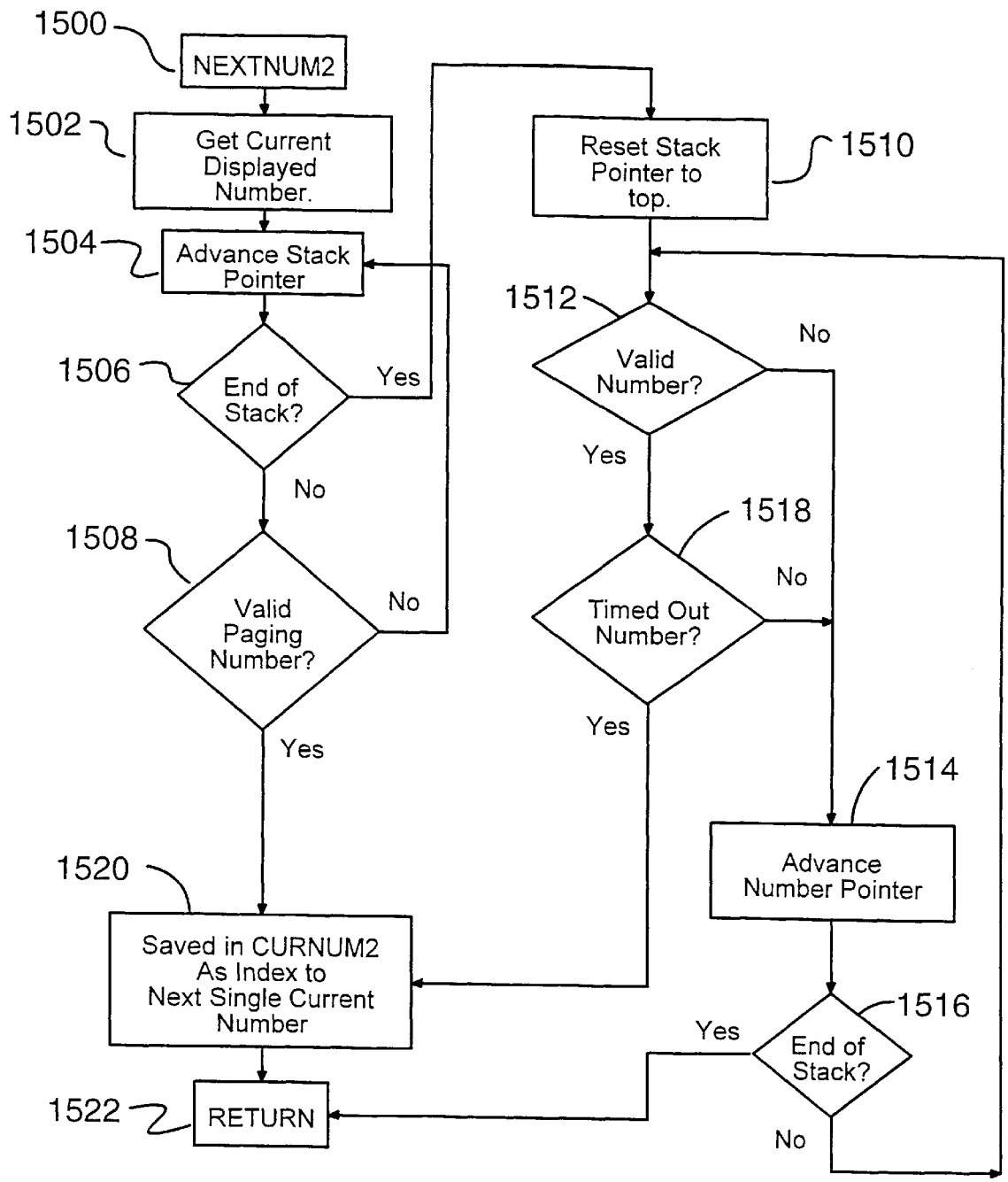

FIG. 15 shows the find next single number index routine.

Figure 16:
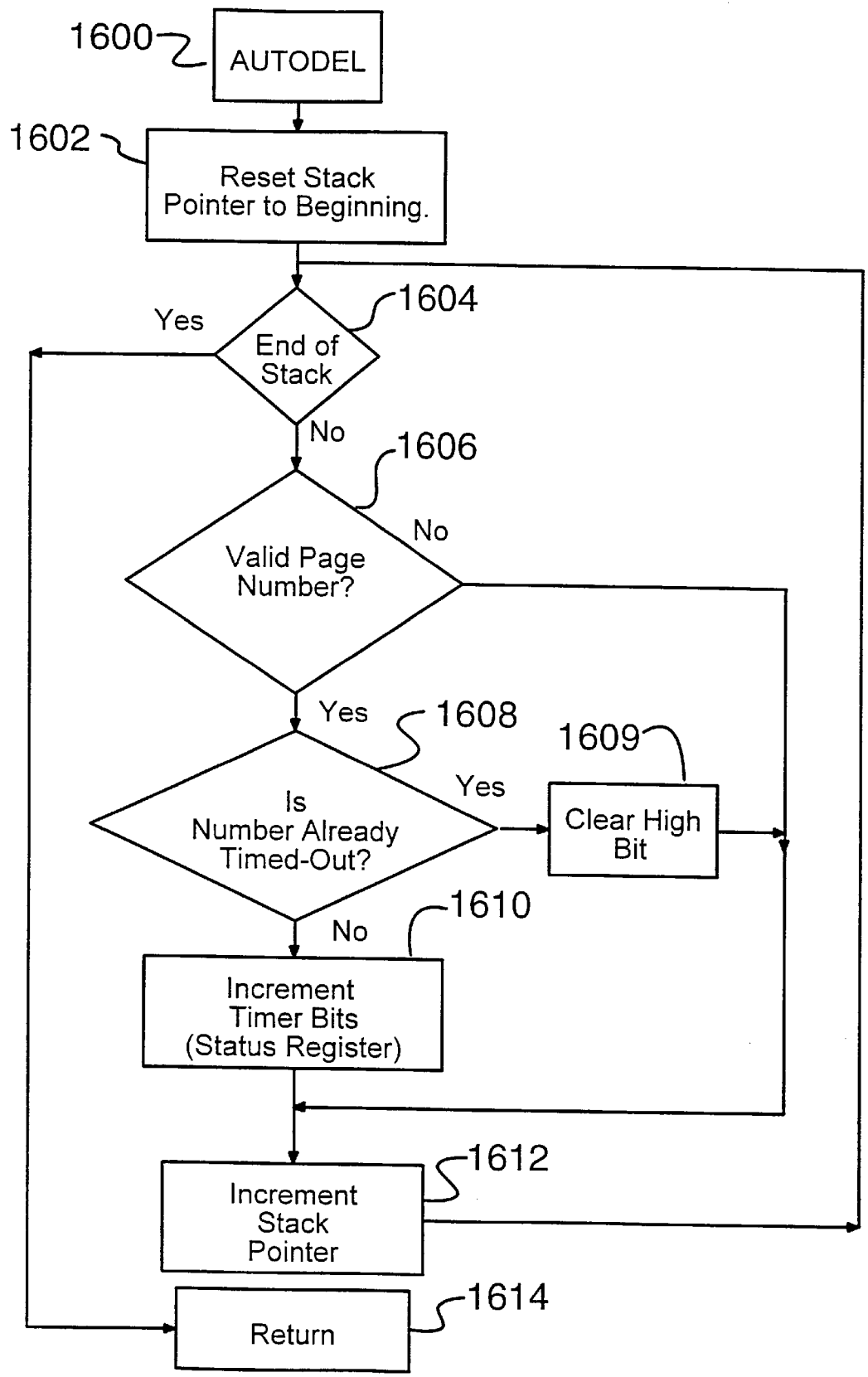

FIG. 16 shows the automatic deletion routine.

Figure 17:
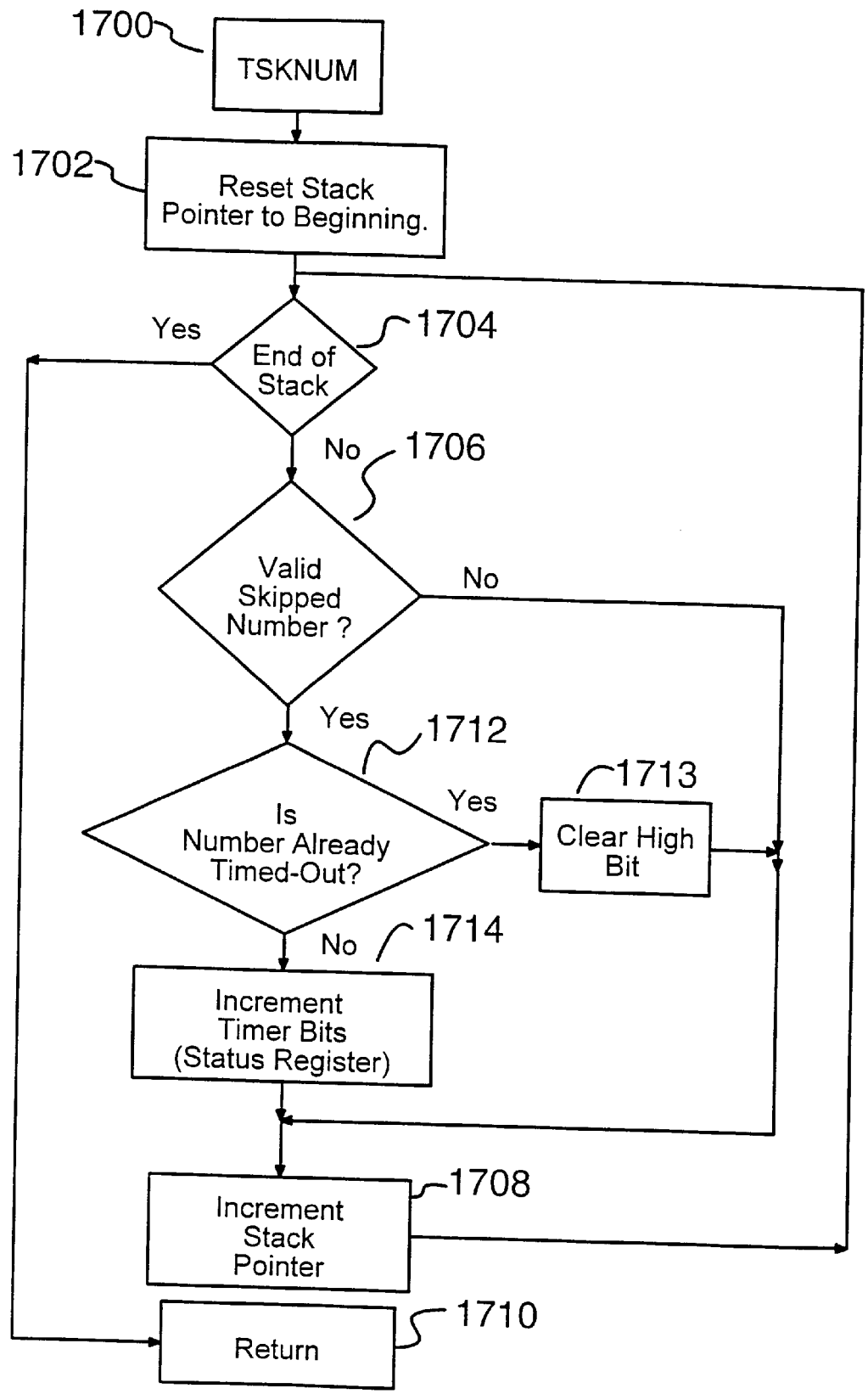

FIG. 17 shows the skipped number timer routine.

Figure 18A:
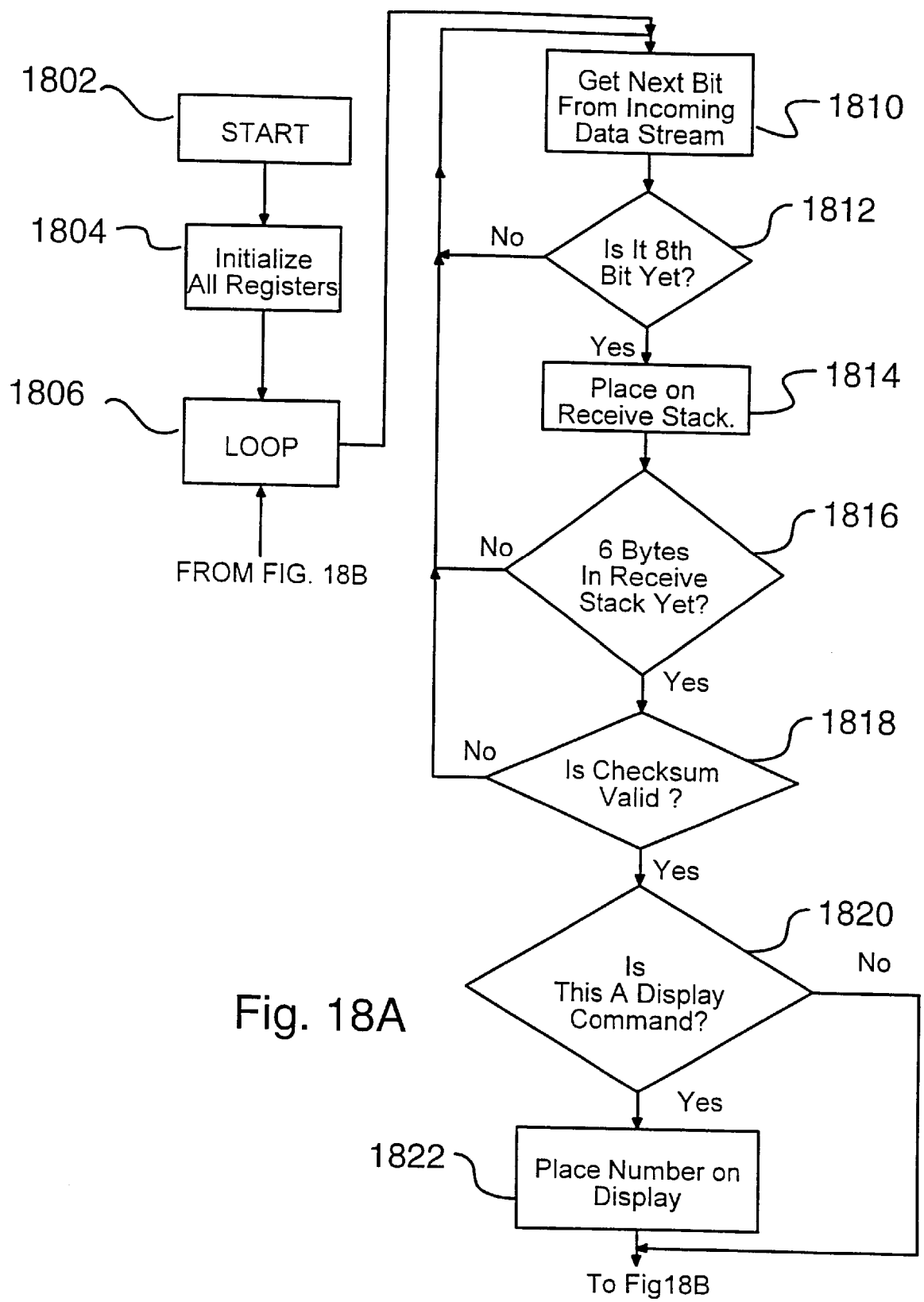
Figure 18B:
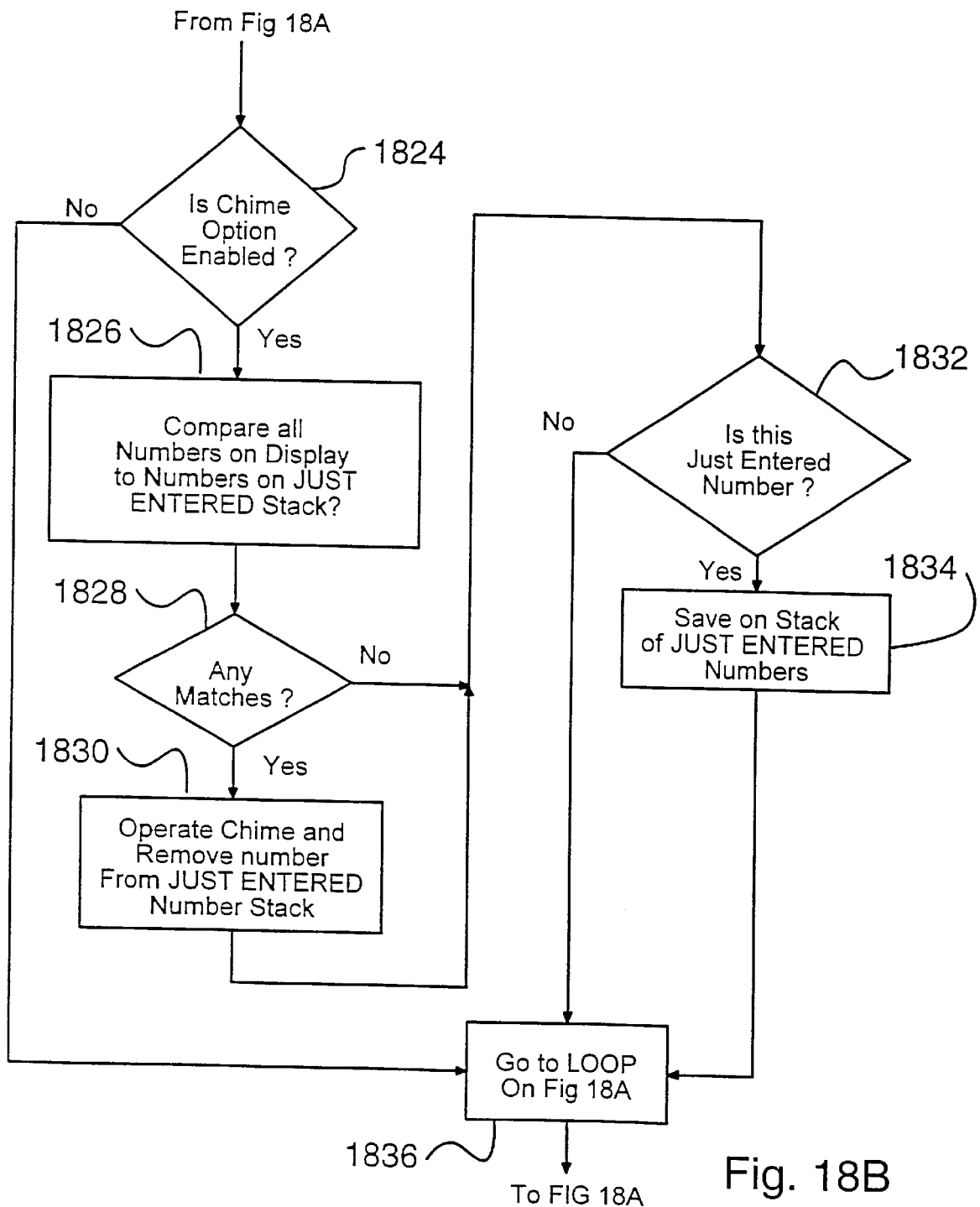

FIGS. 18A and 18B show the display software routine.

Figure 19:
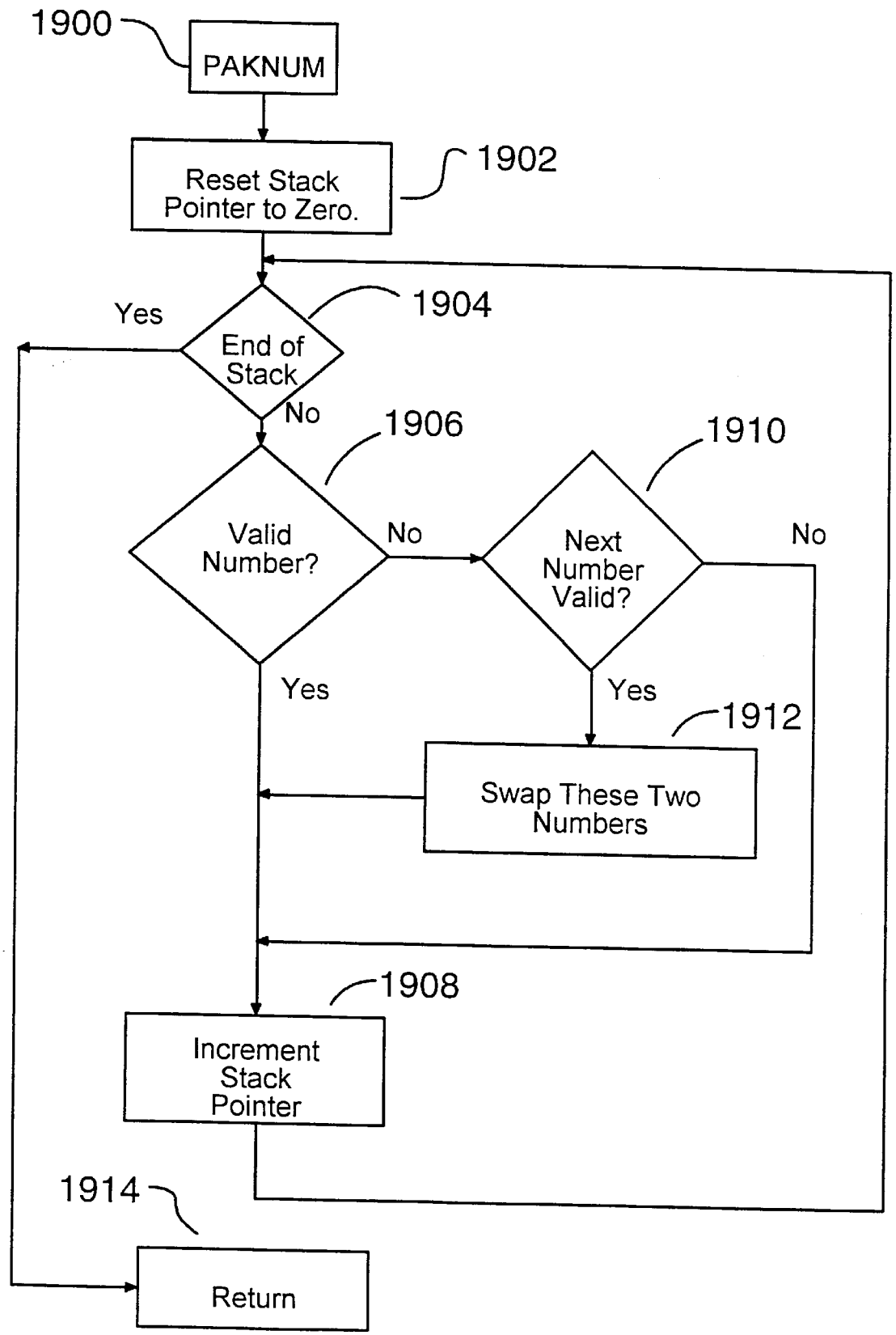

FIG. 19 shows the number and status memory management routine.

The implementation of the method of the invention by the computer program will be understood by reference to the previous examples and FIGS. 7 through 19 comprising block diagram flow charts of the computer program.

As indicated at the start block 170 in FIG. 7, the initial process is block 171 initializes the computer and presets all of the variables in the system. The system then moves on to the GETKEY block 172 step which checks for any incoming data from the keypad. Next block 173 calls the PACKNUM routine (FIG. 19) which manages memory storage of numbers and their status. The system then moves to the POS INTERFACE step 174 which processes information transfer from the interface for the POS system or its terminal. Block 176 calls a GETBYTE subroutine important in implementing a master-slave communication feature to be described below. The system meanwhile is under the influence of the 120 Hz interrupt loop increment timers of FIG. 10 to increment the timers and send out appropriate output information.

The flow charted routine shown in FIG. 8 acts to see if any keys have been pressed. If a key has been pressed, the information is processed.

As indicated at 800 in FIG. 8, the initial step in the Get Key program is the keypad signal access. Control is then forwarded to block 802 to look for a key entry.

In block 802, if a depressed key is not detected then control is passed back to the main program through block 810.

In block 802, if a depressed key or equivalent input is detected then control is transferred to block 804 to see if the depressed key is an entry command.

In block 804, if the depressed key is not an entry command then control is passed to block 806 to detect to see if this is a delete command.

In block 804, if the depressed key is an entry command then control is transferred to block 812 which calls the enter routine. Once the enter routine is processed and control is returned, the program is transferred co block 810 to return control to the main program.

In block 806, if the depressed key is not a delete command then control is passed to block 808 to place the number on the stack. control is then passed to block 810 to return to the main program.

In block 806, if the depressed key is a delete command then control is transferred to block 814 which calls the delete routine. Once the delete routine processes and returns control, the program is transferred to block 810 to return control to the main program.

As shown in FIG. 9A, the pager receives any byte from the POS interface and block 904A places it on a receiver stack in memory. After all five bytes are received from the POS system as determined by blocks 906A and 908A, then the Visual-Pager does a checksum in block 910A and 912A to determine the validity of the data. If the data is valid then the first byte is tested to determine whether this is an ENTER, DELETE command or a control byte by blocks 914A and 916A. The appropriate subroutine is then called by block 918A or 920A to execute the command.

As indicated at block 900A in FIG. 9A the first step is to check for an incoming byte from the POS system.

In block 900A, if no byte is found then no new entry is being received so control is transferred to block 902A where control is returned to the main program.

In block 900A, if a new byte is found to be ready then control is sent to block 904A which places this byte on the receiver stack and sends control to block 906A, which increments the stack pointer and sends control to block 908A where the stack pointer is tested to see if it is out of range.

In block 908A, if the stack pointer is not out of range and a six byte message is not completed, then control is transferred back to block 900A to receive the next byte of information.

In block 908A, if the stack pointer is out of range and a six byte protocol message is present, then control goes to block 910A to reset the stack pointer and process the checksum byte for the message. Control is transferred to block 912A which checks for the validity of the checksum.

In block 912A, if the checksum is not OK then control is transferred to block 902A which refuses invalid message and diverts control to the main program. Otherwise, control is transferred to block 914A where the data is checked to see if it is an enter command.

In block 914A, if the data is not an enter command then control is transferred to block 916A where the data is checked to see if it is a delete command. However, if the data is an enter command then control is transferred to block 918A which processes the enter subroutine and then transfers control to block 902A for the return of control to the main program.

In block 916A, if the data is a delete command then control is transferred to block 920A which processes the delete subroutine and then transfers control to block 902A for the return of control to the main program. However, if the data is not a delete command control is then transferred to block 902A and thence to the main program.

FIG. 9B shows the GETBYTE routine which supports all the information handling between the master and slaves. It listens to the SYSTEM SIGNAL which connects all keypads and displays. The first keypad turned on each day becomes the default master. As each successive keypad is turned on it first listens to the SYSTEM SIGNAL line to determine if other units are ON already. If the SYSTEM SIGNAL line is already powered then it waits for a master assertion command to set all the internal options the same as the master. If the master is turned OFF then the remaining keypads detect the absence of SYSTEM SIGNAL and attempt to seize the MASTER position and send a Master Assertion command. The first successful master assertion command establishes which keypad is the master and all others are slaves. Each keypad listens to the SYSTEM SIGNAL and compares its own transmission on the SYSTEM SIGNAL line to what it thinks it sent on the line. If two or more keypads attempt transmission at the same time there is data crash and the keypad senses this and attempts to retransmit after waiting a random number of 60 Hz cycles. This random number is generated for the lower two bits of the internal 4 MHz clock. Thus if two keypads transmit at the same time the data will crash, and they will wait a different length of time to attempt retransmission and the first successful Master Assertion command will prevail. Each time an entry is made from any keypad (master or slave) that ENTER command with the key stroke is placed on the SYSTEM SIGNAL line. Likewise if a DELETE command is sent it also is placed on the SYSTEM SIGNAL line with the number to be deleted. Therefore if a master hears an ENTER or DELETE command it performs these commands as if they were entered from its own keyboard.

The GETBYTE routine of FIG. 9B operates in similar fashion to that described for the GETPOS routine (FIG. 9A) with each box of the 900B series corresponding to the similarly numbered box of the 900A series except that box 922B tests to see if this is a MASTER ASSERTION command. If it is not then control is transferred to block 902B where control is transferred to the main program. If it is a MASTER ASSERTION program then block 924B processes the data, sets the internal options the same as the master which sent the command, and then returns control to 902B and to the main program.

FIG. 10 shows the interrupt routine (120 Hz) which increments several counters to do routine updates.

As indicated at block 1000 in FIG. 10, the initial step is to initialize this subroutine and begin the process to increment the timers as necessary. The timers are incremented to calculate seconds in this example. Control is first passed to block 1002 for testing if one second has passed since the last time through this subroutine; if not, then control is forwarded to block 1004 for testing for a three second time period. If one second has passed then control is forwarded to block 1012 which calls the subroutine FNSKNUM (shown in FIG. 13). Once the subroutine is completed and control is returned, the control is forwarded to block 1004 for further processing.

If block 1004 senses that three seconds have not yet passed since the last time through this subroutine then control is forwarded to block 1006 for testing for an eight second time period.

If block 1004 senses that three seconds have passed then first control is forwarded to block 1014 which calls the subroutine NEXTNUM (shown in FIG. 14) where that subroutine is completed and control is forwarded to block 1016 where the subroutine NEXTNUM2 is processed (shown in FIG. 15) before control is forwarded to block 1006.

If block 1006 senses that eight seconds have not yet passed since the last time through this subroutine then control is forwarded to block 1008 for testing for a twenty second time period. If block 1006 senses that eight seconds have passed since the last time through this subroutine then control is forwarded to block 1018 to see if this unit is the master unit in the system. If block 1018 senses that this is not a master unit then control is forwarded to block 1008 for further processing.

If block 1018 senses that this is the master unit, then control is forwarded to block 1020 which sends out the master assertion command to put all other units of operation into the slave mode of operation. This master assertion command also contains rollover time, auto delete time and skipped number delay time. Control is then forwarded to block 1008 for further processing.

Block 1008 checks to see if twenty seconds have passed since the last processing of this section of the subroutine, and if twenty seconds have not passed, then control is forwarded to block 1010 for the return of control to the main program. However, if block 1008 senses that twenty seconds have passed, then control is forwarded to block 1022 which calls the AUTODEL routine (shown in FIG. 16). Once control is returned to block 1022 from the AUTODEL subroutine, control is forwarded to block 1024 which calls the TSKNUM routine (shown in FIG. 17). When control is returned from the TSKNUM routine, the control is forwarded to block 1010 for the return of control to the main program.

In FIGS. 11A and 11B, the processing of an 'enter' command in conjunction with the skipped number routine is illustrated. Box 1100 receives control and passes it to box 1102 and then box 1112 if the skipped number option is switched on.

If a skipped number is found corresponding to the entered number by the boxes 1112 and 1114 then that number is deleted from the skipped number stack by box 1126 and control is passed to box 1104. Responding to the ENTER command the number pager stack is searched for room by box 1104. If room is found it strips the number from the ASCII code data stream, and this digit pair is placed on the Paging Number Stack to be displayed in turn. See FIG. 13. The valid number bit is set by box 1134 and the timer portion of the status byte for this number is reset to zero by box 1136 and control is returned by box 1108.

The skipped number hopper may be described as follows: the hopper has 10 slots (or another suitable number of slots) for skipped numbers. Each slot holds two bytes of eight bits. The first byte is the status of that slot. The second byte is the two digit number being stored. Any skipped number and the status of that skipped number may be accessed by adding its index to the base address of "Status 1". This is a simple programming method for making a pointer that points to different numbers in an array. It is used in this program to point to the currently displayed skipped number (SKINDX). See Table I below. It should be noted that the system continues to operate in the same manner as the numbers progress from "98" and "99" through "00" and "01". This is due to a method of incrementing a 0–99 register to determine the next higher number. Thus "00" is the "next higher number" from "99", "01" is the next after that, etc.

TABLE I

| INDEX | STATUS | NUMBER |
|---|---|---|
| 0 | Status 1 | Skipped Number 1 |
| 2 | Status 2 | Skipped Number 2 |
| 4 | Status 3 | Skipped Number 3 |
| 6 | Status 4 | Skipped Number 4 |
| 8 | Status 5 | Skipped Number 5 |
| 10 | Status 6 | Skipped Number 6 |
| 12 | Status 7 | Skipped Number 7 |
| 14 | Status 8 | Skipped Number 8 |
| 16 | Status 9 | Skipped Number 9 |
| 18 | Status 10 | Skipped Number 10 |

The status byte contains the following data and is coded as follows:

| Status Number Bit | | 7 | 6 | 5 | 4 | 3 | 2 | 1 | 0 |
|---|---|---|---|---|---|---|---|---|---|
| Status Bit Use | | E | V | L | T | t | t | t | t |
| t | Bit 0 | 0 = timer | | | | | | | |
| t | Bit 1 | 0 = timer | | | | | | | |
| t | Bit 2 | 0 = timer | | | | | | | |
| t | Bit 3 | 0 = timer | | | | | | | |
| T | Bit 4 | 1 = This number timed out, else 0 | | | | | | | |
| L | Bit 5 | 1 = Last entered numbers | | | | | | | |
| V | Bit 6 | 1 = This is a valid number, else 0 | | | | | | | |
| E | Bit 7 | 1 = End of stack, first byte AFTER last register group | | | | | | | |

The following registers are used and defined here:

SCRACH1 contains the number just entered.

SCRACH2 contains the index of the number just entered.

SCRACH3 contains the incremented version of LARGEST-ENTERED number (done to prevent corrupting LARGEST-ENTERED register.

SCRACH4 is the current incremented TO-BE-SAVED number.

LRGNUM contains the LARGEST INDEX so far today.

LASTLRG contains the LAST LARGEST INDEX so far today (in case it has to be restored because of operator error).

SKINDX contains the CURRENT-SKIPPED-NUMBER-INDEX being displayed on the LCD. This is updated by FIND-NEXT-SKIPPED-NUMBER PGM (FNSKNUM).

As indicated at block 1100 in FIG. 11A, the initial step in the entry system is the entry of a number into the system. As an optional feature, block 1102 represents a switch by which the skipped number feature may be turned off and rendered inoperative. If the skipped number option is "off", and a number pair is entered, the entry program goes to block 1104 and proceeds as explained above.

When the pharmacy starts the day's business the system is preferably initialized by entering and deleting the highest number of the previous day, i.e. the number just before the first number of this day.

If the number was not found in the "skipped number" hopper then the program determines if the number is next in sequence or if some number or numbers have been skipped.

At this point, it should be noted that it has been determined that the number just entered is not a skipped number (i.e. lower than some previous number entered) and, hence, is the largest number entered.

The current number entered is saved by block 1116 in SCRACH4. The program then moves on to block 1118 which increments SCRACH4. The program then proceeds to test block 1120 which tests SCRACH4 for out of range.

If block 1120 finds SCRACH4 is not out of range then the program moves to block 1122 which compares SCRACH4 to the current number. The discussion of the system surrounding block 1122 is presented before discussing the other determination of block 1120 (i.e. out of range).

If block 1122 determines that SCRACH4 is not equal to the current number then there is at least one skipped number and SCRACH4 is saved as a skipped number by block 1124 which returns processing to block 1118 to look for additional skipped numbers.

If block 1122 determines that SCRACH4 is equal to the current number then there is no skipped number and block 1122 causes diversion to block 1132 for housekeeping required for error correction purposes after which the current number proceeds to block 1104 to save the number on PAGE NUMBER stack and continued processing.

Block 1120's making an out-of-range determination is part of an error-detecting optional procedure explained as follows.

An arbitrary number, in this example ten, is determined to be in excess of any actual skipped numbers that would be encountered and thus is presumably due to an input error such as entering "81" instead of "18". Block 1120 acts to detect such an error and, if the current number is out-of-range (largest-number plus some number greater than 10), then all the numbers placed in is the skipped number hopper are now deleted by block 1128. This prevents loading of the skipped number hopper with trash if the operator makes a mistake. Thus, the net result is "zero action" and LARGEST is restored form LAST LARGEST by block 1130. The system then continues processing at block 1104. Routine SKNUMP is only called once each time a number pair is entered.

In FIG. 12, the method for processing the delete subroutine is shown. If there is a DELETE command then the page number stack is searched to see if this number is on the stack, if found it is deleted.

This also serves to remove from the display any number removed from skipped number status. FIG. 12 shows the routine for deleting numbers (DSKNUM) which includes a housekeeping function of deleting a number in the skipped number stack that had not otherwise been deleted. The keypad delete input received in block 1200 activates block 1202 if skipped number option is on to call the DSKNUM routine block 1206 which searches the skipped number stack for that number. Then, if block 1208 detects no duplicate number, block 1208 routes control directly to block 1212. Block 1212 searches the pager number stack for the number to be deleted and transfers control to block 1214. Block 1214 then detects if this number was found.

If block 1214 does not detect the number to be deleted, control is returned through block 1216 to the main program. otherwise, block 1214 finds the number in the paging stack and block 1220 deletes it from the paging stack. Block 1220 then transfers control to block 1216 for return to the main program.

If block 1208 finds the number to be deleted in the skipped number stack, the additional function of deleting the number from the skipped number stack is performed in block 1218 before proceeding to block 1212 for further processing.

The flow chart of FIG. 13 illustrates a routine (FNSKNUM) for finding a skipped number to be displayed to a pharmacist or other system operator as a notice to take corrective action. The FNSKNUM routine is called by block 1012 every predetermined time cycle (for example, one second).

The purpose of the FNSKNUM routine is to display timed out skipped numbers only one at a time while at the same time sequencing through the timed out displayed skipped numbers when there is more than one. Assuming there is more than one timed out skipped number, the process for accomplishing this is shown in FIG. 13.

Block 1300 initialize any items necessary to run this section of the program and then transfers control to block 1302. Block 1302 gets the number which is currently being displayed and then transfers control to block 1304. Block 1304 advances the stack pointer from the current displayed skipped number of block 1302. Block 1304 then transfers control to block 1306. Block 1306 handles the end-of-stack situation.

If the END-OF-STACK condition is not found then the program is forwarded to block 1308. Block 1308 detects invalid skipped numbers.

If block 1308 does not detect a valid skipped number then control is returned to block 1304 and further processing. This causes the stack to advance without action.

If block 1308 does detect a valid skipped number, then control is transferred to block 1324.

If block 1324 does not detect a timed out skipped number then control is transferred to block 1304 and further processing. This causes the stack to advance without action.

If block 1324 does detect a timed out skipped number then control is transferred to block 1320.

Block 1320 saves the number in SKINDX as the next skipped number to display and then transfers control to block 1322. Block 1322 returns control to the main program until the next call of FNSKNUM.

If the END-OF-STACK condition is found by block 1306 then control is forwarded to block 1310. Block 1310 resets the stack pointer to the top of the stack and then transfers control to block 1312. Blocks 1314, 1316, 1312, and 1318 essentially duplicate the functions of blocks 1304, 1306, 1308 and 1324 except when end of stack is encountered for the second time (by box 1316) control is returned to the main program by box 1322. This assures that the entire stack is scanned at least once.

FIG. 14 shows the NEXTNUM routine. This supports the displays of six two-digit numbers commonly used in the pharmacy. It sends the top row of numbers in one 6 byte block and then the bottom row is another 6 byte block. This routine searches the number pager stack every search time interval, in this case 3 seconds, looking for the next 6 numbers to be displayed. If there are any valid numbers found then they are transmitted to large remote displays to page the customers. The Visual-Pager may store as many numbers as necessary, however, a practical limit is around 100 different numbers if the rollover time is 3 seconds between numbers.

The NEXTNUM routine of FIG. 14 operates in the same fashion as described for the FNSKNUM routine with each box of the 1400 series corresponding to the similarly numbered box of the 1300 series except that box 1424 is absent because paged numbers do not time out and box 1420 saves to CURNUM rather than SKINDX.

FIG. 15 shows the NEXTNUM2 routine. This supports a single-2-digit-display which may be connected to the system. This display can be connected to the outdoor display to page drive-through customers back to the drive through window when their prescription is ready. This is an economical way to have a larger (outdoor or large area type) display yet still display all the numbers. This routine runs concurrently with the above routine and picks out one number a time to display. It eventually covers all the numbers but takes 6 times as long to work its way through the stack. This routine searches the number pager stack every time period, in this case 3 seconds, looking for the next single number to be displayed. If there are any valid numbers found then they are transmitted to large remote displays to page the customers. This routine is identical to the NEXTNUM above except that it only transmits one number a time.

The NEXTNUM2 routine of FIG. 15 operates in the same fashion as described for the NEXTNUM routine with each box of the 1500 series corresponding to the similarly numbered box of the 1400 series except that box 1520 saves to CURNUM2 rather than CURNUM.

FIG. 16 shows the AUTODEL subroutine. Every programmable time period, in this case 20 seconds, the AUTODEL routine is called to increment the timer part of the status byte for each customer number in the stack. The complete stack is searched and if a valid number is found the status byte is incremented by one count. Assuming the status byte starts at XX000000 and approximately every 20 seconds it is incremented then after 64 increments or 1280 seconds bit 5 would be set. This indicates the customer number has been displayed about 20 minutes and will now be deleted because the customer has not shown up.

As indicated at block 1600 in FIG. 16, the first step is to initialize the subroutine and pass control to block 1602. Block 1602 resets the stack pointer to zero and passes control to block 1604 where the pointer is tested to see if it is the end of the stack.

If block 1604 does not find the end of the stack, then control is transferred to block 1606 where the number is tested to see if it is a valid number.

If block 1606 does not detect a valid number, then control is transferred to block 1612 where the stack pointer is incremented. Block 1612 then transfers control back to block 1604 for further processing.

If block 1606 does detect a valid paged number, then control is transferred to block 1608 where the number is tested to see if it has already timed out.

If block 1608 does not detect that the number has timed out, then control is transferred to block 1610 where the timer byte register is incremented. Block 1610 then transfers control to block 1612 for further processing as described above.

If block 1608 does detect that the number has timed out, then control is transferred to block 1612 for further processing as described herein.

If block 1604 does find the end of the stack, then control is passed to block 1614 where control is returned to the calling program, at which time the current time status has been set for all numbers and new timed out numbers so marked (bit 5 set).

FIG. 17 shows a TIMED-SKIPPED-NUMBER program in the timer routine on the CPU. TSKNUM program of FIG. 17 is called periodically (about every 20 seconds for this example) and it searches the entire skipped number hopper and increments the status bit of every valid skipped number. After a skipped number has been in the skipped number hopper for about five minutes, bit 4 is finally set as the status bit is incremented from 01×01111 to 01×10000. When bit 4 is set, the status register is no longer incremented. The binary incrementing would be as follows:

| Number first entered | 01×00000 |
|---|---|
| After 18 seconds | 01×00010 |
| After 36 seconds | 01×00011 |
| | 01×00100 |
| | 01×00101 |
| | 01×00110 |
| | 01×00111 |
| | 01×01000 |
| | 01×01001 |
| | 01×01010 |
| | 01×01011 |
| | 01×01100 |
| | 01×01101 |
| | 01×01110 |
| | 01×01111 |
| After five mintes | 01×10000 |

The process may be explained as follows. Block 1700 initializes this section of the program. Block 1702 resets the stack pointer after which block 1704 tests for END-OF-THE-STACK, which, if found after many executions of the program loop, causes a return by block 1710 to the main program. When block 1704 does not find an END-OF-THE-STACK condition, then it moves the program on to Block 1706 to detect for valid skipped numbers.

If block 1706 does not detect a valid skipped number, it moves the program on to block 1708 which increments the stack pointer and returns the program to block 1704 for further processing. However, if block 1706 does detect a valid skipped number, then it moves control on to block 1712.

Block 1712 detects numbers that are already timed-out. If the number is not found to be already timed-out, then control is moved on to block 1714 which increments the timer byte (status register) and transfers control to block 1708 to increment the stack pointer and return to box 1704 for further processing as described above.

If block 1712 does detect an already timed out number then it transfers control to block 1708 for further processing as described above.

FIGS. 18A and 18B show the program which processes data for the displays. The display routine normally is run in the display processor. The routine checks the incoming signals and looks for coherent strings of 6 bytes that have a valid check sum. If the strings are found the routine processor acts on the command accordingly. If it is a 6-numbers display (two digit numbers) then it routes the "83" command first row data to the top row of the display and likewise the "8D" command to the second row of numbers. With the chime option this routine continually listens for the "87" command for entered numbers. If anyone enters a number this command is sent with that new number. The display routine stores this number in memory and then continually compares it to all incoming current numbers (83 or 8D). If it is found then it operates a contact closure or triac for a 200 ms period to operate a door bell chime or voice automatic announcement message. If the display is a single number style (single 2 digit) then depending on option switch set it will respond to either 8F (Current Skipped number) or 91 (Current single number).

The system according to the invention uses a novel data communication protocol which will be described particularly with reference to FIG. 18a and FIG. 18b. All transmissions on the signal cable which connects all displays, keypads, and other inputs (including cables 106, 110, 114, and 124 shown in FIG. 1) operate using the six byte communication protocol described below. All displays and keypads listen for signals on their respective input cables and the resident processor determines the action to be taken based on the data received which includes command data, customer number data, and system management data.

In the display configuration illustrated herein, multi-number displays, such as display 108, are set up to display a total of 6 two-digit customer numbers, 3 in a top row and 3 in a bottom row. A six byte transmission is capable of transmitting data for three customer numbers together with command data and system management data including a check sum. Bytes 2, 3, and 4 are designated for three customer numbers which will usually range from 00 to 99. Byte 1 is designated for the command byte which in general will provide information on the significance of the numbers in bytes 2, 3, and/or 4. For example, command code 83 informs that bytes 2, 3, and 4 are a top row of three current customer numbers to be displayed, while command 8D provides information that bytes 2, 3, and 4 are a second row of three current customer numbers to be displayed on the multiple number display 108 and/or elsewhere. The details of the communication protocol are shown in Tables 1 and 2 below giving the byte protocol and the commands protocol respectively. Byte Protocol 1. Command 83, 85, 87, etc.
2. Number 1 00–99 (Left number)
3. Number 2 00–99 (Center number)
4. Number 3 00–99 (Right number)
5. Address of sending unit 00–256
6. Checksum 00–256

Commands List and Protocol

83=First row of 3 current numbers to six-number display
85=Number just Deleted from keypad
87=Number just Entered from keypad
89=Test Set serial number insertion (used only in test)
8B=Master Assertion command, rollover time and auto delete time, revision number, skipped number time
8D=Second row of three current numbers to 4600 display
8F=Current skipped number
91=Current single number for 4100 display Protocol for Bytes 1–4
(Bytes 5 and 6 are always address and checksum)

| Byte 1 | Byte 2 | Byte 3 | Byte 4 |
| --- | --- | --- | --- |
| 83 | Top Left Num. | Top Center Num. | Top Right Num |
| 85 | Number Deleted | Unused | Unused |
| 87 | Number Entered | Unused | Unused |
| 89 | Serial Number | Serial Number | Unused |
| 8B | Rollover, Skipnum | Autodelete | Rev Number |
| 8D | Bottom Left Num. | Bot. Center Num. | Bot. Right Num. |
| 8F | Skipped Number | Unused | Unused |
| 91 | Single number | Unused | Unused |

Figure 21:
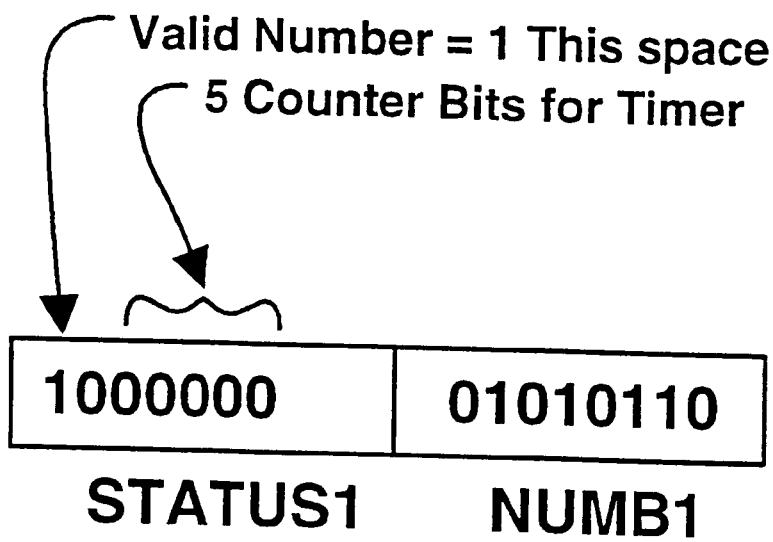
Figure 21:
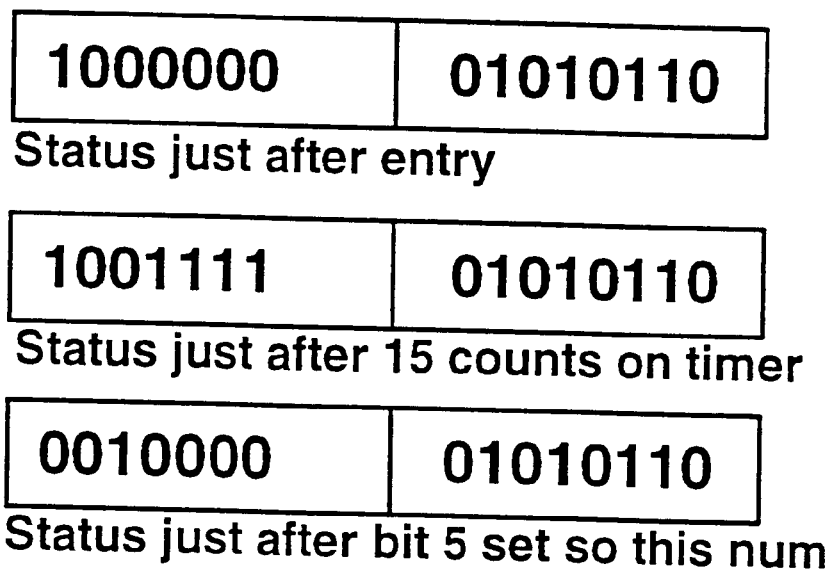

Processing of the data described above is implemented in a simple processor in the display, the operation of which will be understood from FIGS. 18A, 18B, and 21. FIGS. 18A and 18B show a flow chart for a display getbyte and show number routine. The routine is started at box 1802 and progresses to box 1804 where the registers are initialized and then to box 1806 which initiates the routine main loop.

Box 1810 receives the next bit from the incoming data stream and boxes 1812 and 1814 collect eight successive bits to form a byte which is placed on a receive stack by box 1814. Box 1816 monitors the received stack and when six bytes are received, proceeds to the check-sum test box 1818 which advances the program in a case of a valid checksum to box 1820 which selects only display commands to go to box 1822 which places a number or numbers on one or more displays. Referring to FIG. 18B, a routine advances from box 1822 to box 1824 which determines if the chime feature is enabled to call attention to newly entered numbers.

If the chime option is not enabled as determined by box 1824, the routine is advanced to box 1836 and box 1806 to start another loop as previously described. If the chime option is enabled, then the program advances from box 1824 to box 1826 and all numbers of the display are compared to numbers on the JUST-ENTERED stack; and if matches are found between these two sets in box 1828, then the program progresses to box 1830 which causes the chime or other audible and/or visual signal to be operated indicating a newly entered number; that number is then removed from the just entered number stack, If no matches were found in the operation of box 1828, the chime is not operated; in either case, the routine proceeds to box 1832 which consults the command code to determine if the number is a just-entered number in which case the routine proceeds to box 1834 and that number is saved on the stack of JUST-ENTERED numbers. Regardless of the determination made in box 1832, the routine proceeds, directly or indirectly, to box 1836 and box 1806 at the start of the main loop in FIG. 18A.

On return to block 1810 in FIG. 18A, the first step is to get the next bit from the incoming data stream. Control is then forwarded to block 1812 to see if this is a complete 8 bit message. When block 1812 does not detect the 8th bit, control is sent back to block 1810 to get the next bit, and the routine proceeds as FIG. 18A is described above.

Figure 20:
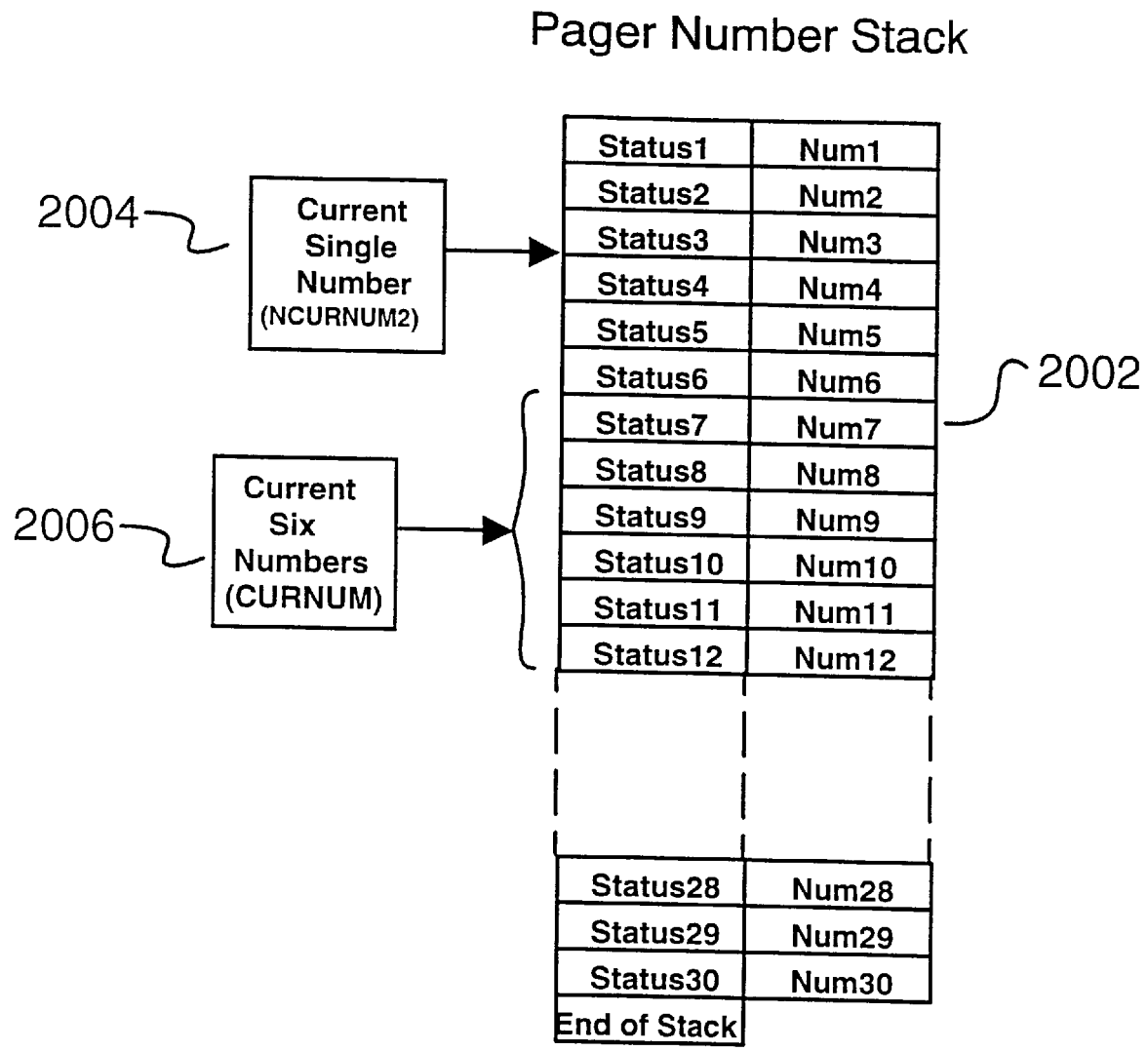
FIGS. 20 and 21 are block diagrams used to explain the number and status memory operation.

Referring now to FIG. 19 showing a flow chart of the PAKNUM routine, the purpose of this routine is to remove numbers which are not valid (blanks or deleted numbers) and pack the pager number stack. The pager number stack is shown in FIG. 20 wherein an exemplary stack of 30 number bytes and associated status bytes is shown as stack 2002. A current single number indicator is shown at block 2004 and a current six numbers indicator is shown at block 2006.

The PAKNUM routine is continually called from the main program run loop FIG. 7 and the initialization block for the routine is block 1900 together with block 1902 which sets the stack pointer to zero preparatory to scanning the stack. Control passes from block 1902 to block 1904 which detects the end of the stack after the stack has been scanned and returns control to the main program by way of box 1914.

If the end of the stack has not been reached, block 1904 passes control to block 1906 which checks the status of the number pointed to and, if it is a valid number, passes control to block 1908 which increments the stack pointer and returns to block 1904 to repeat the process. If block 1906 finds the status of the number pointed to is not valid, i.e. the slot in the stack is available for reuse, then control is passed to block 1910 which checks to see if the status of the next number is valid. If it is not, then control is passed to block 1908 to increment the stack pointer and continue the loop with no action being taken.

If the next number status is valid, then control passes to block 1912 which swaps these two numbers before passing control to block 1908 to increment the stack pointer and return to the beginning of the loop at block 1904. Note that, when an invalid number has been swapped with a valid number, it will be checked again by block 1906 on the succeeding loop transit, and will continue to be moved to the end of the valid numbers in the stack. Since this routine is continually called by the main program, it will only be a short time until all the valid numbers are at the beginning of the stack and all the deleted or otherwise invalid numbers are moved to the end of the stack (even if two or more invalid numbers appeared at one call of PAKNUM.

From FIG. 21 it will be seen how the automatic delete cooperates with the PAKNUM routine to keep the pager number stack from being cluttered. As previously explained, the valid number bit in the status byte is the highest order bit while there are 5 counter bits provided for the pager number timer. Just after entry, all of the timer bits are zero and the timer counts up in binary notation until after 15 counts on the timer, the four lowest order bits are one; with the next up-count bit 5 is set and the AUTO-DELAY routine causes the highest order bit to be reset to 0. This will result in this number and its status byte being moved to the end of all of the valid numbers by the PAKNUM routine.

Figure 22:
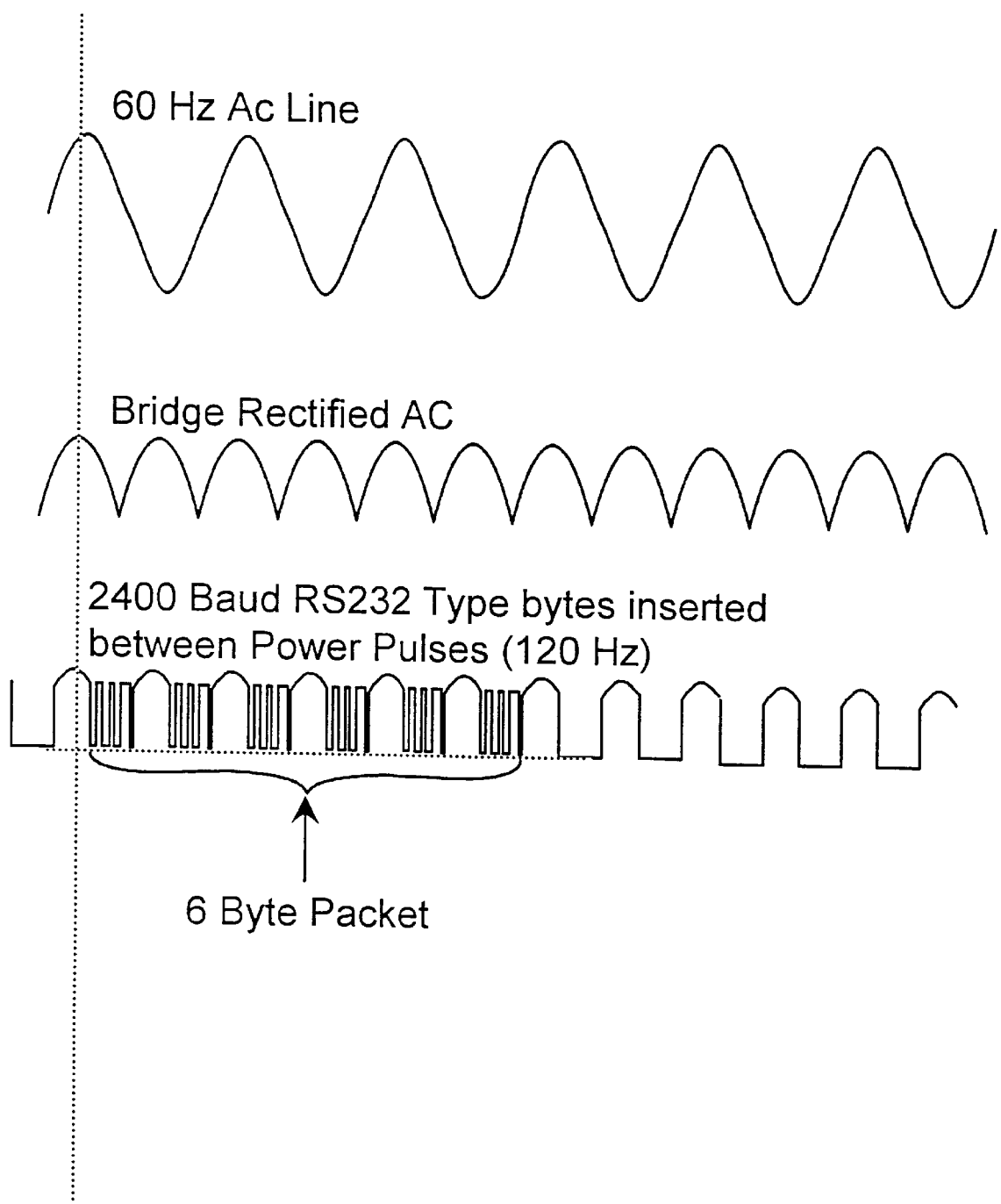
FIG. 22 is a schematic diagram showing formation of combined power and data transmission signals.
Figure 23:
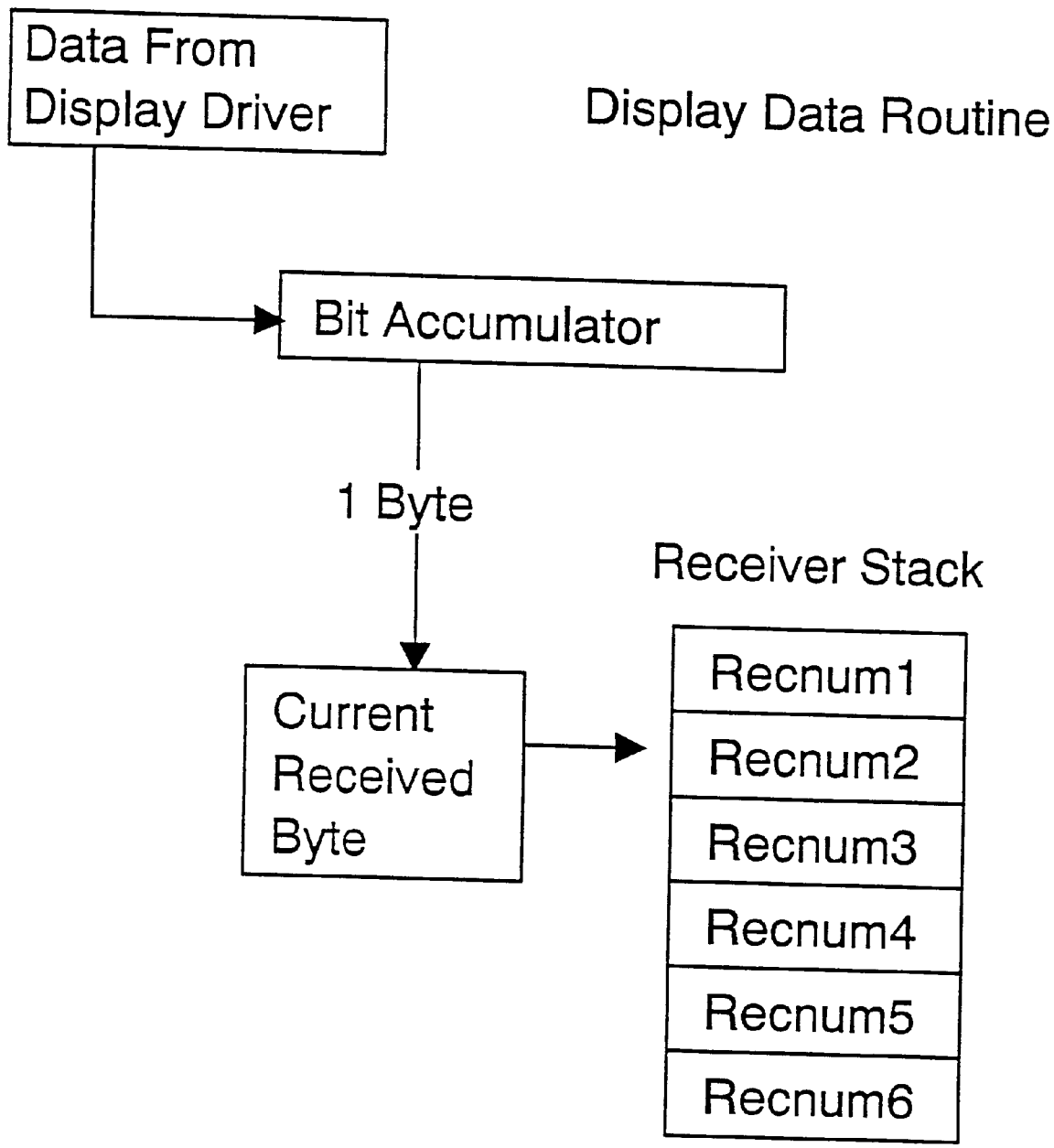
FIG. 23 is a block diagram used to explain the flow of information of the Display Data Routine.

A preferred data transmission format is shown in FIG. 22. All data is transmitted in the form of 2400 baud bytes inserted in-between power pulses that power the display. This is an improved format based on McCullough, U.S. Pat. No. 4,992,774, dated Feb. 12, 1991. The time between cycles and transmission bytes is 8.3 milliseconds. Each byte is approximately 4.2 milliseconds long. This leaves a minimum of 4 milliseconds to transmit power to the displays. All transmissions are 6 byte strings with the first byte being the command and the next three bytes data. The fifth byte is the address of the originating device, and the sixth byte is the checksum of the previous five bytes, all as previously explained.

This data transmission format is described by way of example and numerous variations are possible. For example, three digit customer numbers could be used from 0 to 999 by expanding the number field; more or fewer bytes than six could be used; or other variations could be made.

It is believed that the overall operation of the system will be apparent from the previous description, however some further discussion of incidental or optional features of the system may be helpful. The LCD screen of the local display is preferably refreshed about every millisecond. The LCD driver loop first checks to see if there are any valid skipped numbers waiting to be displayed. If there are, it displays a message "SKIP #" and a number that has been skipped. If more than one number has been skipped, they will be displayed sequentially as previously explained. In any case, the regular numbers now being paged are displayed. If there are no skipped numbers, only the currently paged numbers are displayed. The wide area display does not display the skipped numbers, only the currently paged numbers. However, a wide area display could be used to display the next customer's number. This allows for the customers that are waiting in line to be able to see how many people are in the que for order fulfillment. As another alternative, the wide area displays could provide the numbers of the orders being fulfilled or even the order in which the numbers are being processed. This provides additional information to the customer which alleviates dissatisfaction due to the waiting period by providing the customer with additional information.

In addition to deleting paged numbers from the wide area display which have been completed by delivery to the customer, the delete button may also be used to correct errors. In this case the DSKNUM routine checks to see if the number to be deleted is the same as the last number just entered, if so, then this program deletes all the last entered skipped numbers. This corrects the erroneous skipped number entries generated because of the operator error.

An optional alarm or alert may be provided for skipped numbers which have timed-out and it may be implemented by voice, visually, by beeper, or by a printout.

As previously described, the preferred system has an optional feature whereby an erroneous entry that would generate skipped numbers in excess of ten is diverted without generating skipped numbers. When the erroneous number caused by reverse digits or otherwise is eventually deleted, it will leave behind no false skipped numbers to create problems in the system. This feature, together with the ability to immediately delete an erroneous entry and simultaneously eliminate any skipped numbers generated thereby, renders the system relatively free from operator induced error.

Should the tickets or stickers for a particular number be lost or discarded before being issued to a customer, that number may be deleted from the skipped number hopper by simply pressing "DELETE" and that number. It is not necessary to enter the number as a ready number.

In a preferred embodiment, the time delay between when a skipped number is stored in the skipped number hopper and when it is displayed as a skipped number is programmable by the operator from zero to nine minutes. Setting its time delay at five minutes is a good balance between having skipped numbers showing too frequently or waiting too long before resolving any problem situation. It should be recalled that when a customer's number is skipped and then later entered into the keypad, this number is removed from the skipped number hopper and, if before the program time delay (for example, five minutes), it does not even attract the attention of the pharmacist. Of course, if the programmable delay time is exceeded, it is called to the attention of the pharmacist by being displayed as a skipped number and by whatever alert signal is being employed.

The system allows one to store the following setups in EEPROM. These setups are then remembered and if this is the master, these setups are transmitted at the same time the master assertion command is transmitted. This allows one to program one keypad and have all the important setups transmitted to all keypads on the bus.

In the ordinary operation of the Keypad it is only necessary to press two keys such as 1-2 to enter 12 because the enter function is automatic after the second digit. To DELETE you must press DELETE and then 1-2. The Quick Delete function reverses this. It is useful in some high volume pharmacies where they prefer to delete the numbers as they are picked up by the customer. A second keypad is placed by the pickup area so that is necessary to only press 1-2 to Delete the number 12. To enter a number from this keypad you must press ENTER 1-2 enter the number 12.

It should be understood that modifications may be made in this system by changing the nature of the wide area display or otherwise to change the paging to incorporate voice or attention-getting features. Also, the skipped number monitoring feature which is an important aspect of this system can be supplemented with other conventional queue management or customer service management features without negating the utility and effectiveness of the novel features provided by the present invention.

It should be noted that the present system functions with known point-of-sale hardware and software systems. It can do so with minimal modification of the POS system. On the other hand, some or most of the pager system software may be incorporated in the POS software so that the system is effectively integrated with the POS system.

In addition to the modifications and variations of the system which have been described or suggested, other variations and modifications will be apparent to those of skill in the art and, accordingly, the scope of the invention is not be deemed limited to the preferred embodiment or variations disclosed or suggested, but is, rather, to be determined by reference to the appended claims.

What is claimed is:

1. In a point of sale data processing system having means for recording each received one of a series of customer orders, means for communicating each received order to an order fulfillment station, and means for recording that particular ones of said orders are fulfilled, the improvement of apparatus comprising:

means for selecting a sequentially numbered marker for a customer order as it is received;

means for relating said marker to particular customer order data;

means for communicating said marker to a customer for whose order it was selected;

means for identifying one or more markers as a ready marker when said particular customer order related to said marker is fulfilled;

means for storing in accessible memory each ready marker identification;

a customer presence area display:

means for temporarily communicating said markers identified as a ready marker to said customer presence area display; and means for periodically updating said display from information stored in said accessible memory.

2. Apparatus according to claim 1 wherein said marker is selected from a consecutive numerical marker series of at least 99 markers.

3. Apparatus according to claim 2 further including means for verifying the validity of said marker against said marker series.

4. Apparatus according to claim 2 further including a means for communicating the next consecutive marker to the next potential customer.

5. Apparatus according to claim 1 further including means for determining customer order transaction completion for a particular marker and deleting the corresponding ready marker identification in said accessible memory.

6. Apparatus according to claim 1 further including a means for recording fulfilled customer order data, and for determining customer order transaction completion for a particular customer order marker with respect to the records of the fulfilled customer order data.

7. Apparatus according to claim 1 further including a means for automatically removing indication of a particular marker from said means for communicating a marker to said customer presence area after a predetermined time.

8. Apparatus according to claim 1 further including a means for interfacing with an existing form of point-of-sale system to receive order entry and order fulfillment information therefrom.

9. Apparatus according to claim 1 wherein said means for communicating said marker to a customer presence area display includes means for producing an audible announcement.

10. Apparatus according to claim 1 wherein said means for communicating said marker to said customer uses printed communication.

11. Apparatus according to claim 1 further including means for interfacing with an existing form of point-of-sale system.

12. Apparatus according to claim 1 further including a means for implementing a skipped marker display system.

13. Apparatus according to claim 1 including multiple data input devices controlled in a master-slave configuration.

14. Apparatus according to claim 1 wherein said customer presence area display has the capability of simultaneously displaying a plurality of ready markers.

15. In a point of sale data processing system having means for recording customer order data, means for communicating said order data to an order fulfillment station, and means for recording that a particular order is fulfilled, the improvement of apparatus comprising:

means for selecting a marker for a customer order;

means for relating said marker to particular customer order data;

means for communicating said marker to a customer for whose order it was selected:

means for identifying a marker as a ready marker when the related customer order is fulfilled;

means for implementing a skipped marker display system; and means for temporarily communicating a marker to a customer presence area when it is identified as ready.

16. In a point of sale data processing system having means for recording customer order data, means for communicating said order data to an order fulfillment station, and means for recording that a particular order is fulfilled, the improvement of apparatus comprising:

means for selecting a marker for a customer order;

means for relating said marker to particular customer order data;

means for communicating said marker to a customer for whose order it was selected;

means for identifying a marker as a ready marker when the related customer order is fulfilled;

multiple data input devices controlled in a master-slave configuration; and means for temporarily communicating a marker to a customer presence area when it is identified as ready.

17. Improved apparatus used with a point-of-sale data processing system for monitoring and communicating the completion of sequentially identified tasks identified by task markers comprising:

means for designating a deliverable task marker as ready and concurrently, for unready task markers earlier in sequence than such task marker turned ready, marking each such unready task marker as skipped;

means for communicating ready task markers to a large area including a multi-digit visual display device;

a local area display device and means for communicating selected skipped task marker identities to said local area display device;

means for removing a skipped task marker from skipped status and designating it as ready when said skipped task marker becomes ready; and means for causing ready task marker identities displayed on said visual display device to be deleted in response to a delete instruction.

18. Apparatus according to claim 17 wherein each said marker is selected from a numerical marker series.

19. Apparatus according to claim 17 further including a means for recording fulfilled task data, and for determining task transaction completion for a particular task marker with respect to the records of the fulfilled task data.

20. Apparatus according to claim 17 further including means for automatically removing indication of a particular marker from said means for communicating markers to said large area.

21. Apparatus according to claim 20 further including means for verifying the validity of said marker against said marker series.

* * * * *